US008861582B2

(12) United States Patent
Shibasaki

(10) Patent No.: US 8,861,582 B2
(45) Date of Patent: Oct. 14, 2014

(54) DECISION FEEDBACK EQUALIZER, RECEIVING CIRCUIT, AND DECISION FEEDBACK EQUALIZATION PROCESSING METHOD

(75) Inventor: Takayuki Shibasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 478 days.

(21) Appl. No.: 13/178,744

(22) Filed: Jul. 8, 2011

(65) Prior Publication Data

US 2012/0033726 A1 Feb. 9, 2012

(30) Foreign Application Priority Data

Aug. 4, 2010 (JP) .................................. 2010-175743

(51) Int. Cl.
*H04L 27/01* (2006.01)
*H04L 25/03* (2006.01)

(52) U.S. Cl.
CPC ... *H04L 25/03057* (2013.01); *H04L 2025/0503* (2013.01)
USPC .......................................................... 375/233

(58) Field of Classification Search
CPC ............ H04L 25/03057; H04L 25/061; H04L 25/03159
USPC .......................................... 375/233, 232, 316
See application file for complete search history.

(56) References Cited

U.S. PATENT DOCUMENTS

| | | | | |
|---|---|---|---|---|
| 7,693,214 B2* | 4/2010 | Shida | ............................. | 375/232 |
| 7,973,691 B2* | 7/2011 | Yamaguchi et al. | ........... | 341/155 |
| 8,102,906 B2* | 1/2012 | Hollis | ............................ | 375/230 |
| 2006/0209945 A1* | 9/2006 | Yamaguchi | ................... | 375/232 |
| 2009/0238240 A1* | 9/2009 | Lakkis | ........................... | 375/130 |
| 2009/0316770 A1* | 12/2009 | Hidaka | ........................... | 375/233 |
| 2010/0020861 A1* | 1/2010 | Leibowitz et al. | ............. | 375/231 |
| 2010/0194611 A1* | 8/2010 | Kibune | ........................... | 341/118 |
| 2011/0044382 A1* | 2/2011 | Nakamura et al. | ............. | 375/229 |
| 2011/0249519 A1* | 10/2011 | Tamura | ..................... | 365/189.15 |

FOREIGN PATENT DOCUMENTS

| JP | 8-116297 A | 5/1996 |
|---|---|---|
| JP | 2007-274022 A | 10/2007 |

OTHER PUBLICATIONS

Keshab K. Parhi, "Design of multigigabit multiplexer-loop-based decision feedback equalizers", IEEE Transactions on Very Large Scale Integration (VLSI) Systems, US, IEEE, Apr. 4, 2005, vol. 13, Issue.4, pp. 489-493.

* cited by examiner

*Primary Examiner* — Shuwang Liu
*Assistant Examiner* — Helene Tayong
(74) *Attorney, Agent, or Firm* — Fujitsu Patent Center

(57) ABSTRACT

A decision feedback equalizer includes: L equalization calculation circuits to perform an equalization calculation of a first sample of input data for each of M combinations of data decision values of a second sample sampled from the input data before sampling the first sample; a first logic circuit to generate first M logical values by selecting and arranging calculation values of M calculation values calculated by at least one equalization calculation circuit among the L equalization calculation circuits based on a data decision value for a third sample sampled before sampling the first data; and a selection circuit to select one of the first M logical values based on a data decision value for a fourth sample sampled before sampling the third sample, and to output the selected logical value as a data decision value of the first sample.

17 Claims, 29 Drawing Sheets

FIG. 5

| $a_0$ | $b_0$ | $d_0$ | $d_1$ | | |
|---|---|---|---|---|---|
| | | | $d_{-1}$ | $0(a_1')$ | $1(b_1')$ |
| 0 | 0 | 0 | | $a_1$ | $a_1$ |
| 0 | 1 | $d_{-1}$ | | $a_1$ | $b_1$ |
| 1 | 0 | $\overline{d_{-1}}$ | | $b_1$ | $a_1$ |
| 1 | 1 | 1 | | $b_1$ | $b_1$ |

FIG. 6

| $a_0$ | $b_0$ | $a_1'$ | $b_1'$ |
|---|---|---|---|
| 0 | 0 | $a_1$ | $a_1$ |
| 0 | 1 | $a_1$ | $b_1$ |
| 1 | 0 | $b_1$ | $a_1$ |
| 1 | 1 | $b_1$ | $b_1$ |

FIG. 9

| $a_1'$ | $b_1'$ | $d_1$ | $d_2$ | | |
|---|---|---|---|---|---|
| | | | $d_{-1}$ | $0(a_2')$ | $1(b_2')$ |
| 0 | 0 | 0 | | $a_2$ | $a_2$ |
| 0 | 1 | $d_{-1}$ | | $a_2$ | $b_2$ |
| 1 | 0 | $\overline{d_{-1}}$ | | $b_2$ | $a_2$ |
| 1 | 1 | 1 | | $b_2$ | $b_2$ |

FIG. 10

| $a_1'$ | $b_1'$ | $a_2'$ | $b_2'$ |
|---|---|---|---|
| 0 | 0 | $a_2$ | $a_2$ |
| 0 | 1 | $a_2$ | $b_2$ |
| 1 | 0 | $b_2$ | $a_2$ |
| 1 | 1 | $b_2$ | $b_2$ |

| $a_0$ | $b_0$ | $e_0$ | $f_0$ | $a_1'$ | $b_1'$ | $e_1'$ | $f_1'$ |
|---|---|---|---|---|---|---|---|
| 0 | 0 | 0 | 0 | $a_1$ | $e_1$ | $a_1$ | $e_1$ |
| 0 | 0 | 0 | 1 | $a_1$ | $e_1$ | $a_1$ | $f_1$ |
| 0 | 0 | 1 | 0 | $a_1$ | $e_1$ | $b_1$ | $e_1$ |
| 0 | 0 | 1 | 1 | $a_1$ | $e_1$ | $b_1$ | $f_1$ |
| 0 | 1 | 0 | 0 | $a_1$ | $f_1$ | $a_1$ | $e_1$ |
| 0 | 1 | 0 | 1 | $a_1$ | $f_1$ | $a_1$ | $f_1$ |
| 0 | 1 | 1 | 0 | $a_1$ | $f_1$ | $b_1$ | $e_1$ |
| 0 | 1 | 1 | 1 | $a_1$ | $f_1$ | $b_1$ | $f_1$ |
| 1 | 0 | 0 | 0 | $b_1$ | $e_1$ | $a_1$ | $e_1$ |
| 1 | 0 | 0 | 1 | $b_1$ | $e_1$ | $a_1$ | $f_1$ |
| 1 | 0 | 1 | 0 | $b_1$ | $e_1$ | $b_1$ | $e_1$ |
| 1 | 0 | 1 | 1 | $b_1$ | $e_1$ | $b_1$ | $f_1$ |
| 1 | 1 | 0 | 0 | $b_1$ | $f_1$ | $a_1$ | $e_1$ |
| 1 | 1 | 0 | 1 | $b_1$ | $f_1$ | $a_1$ | $f_1$ |
| 1 | 1 | 1 | 0 | $b_1$ | $f_1$ | $b_1$ | $e_1$ |
| 1 | 1 | 1 | 1 | $b_1$ | $f_1$ | $b_1$ | $f_1$ | ved Art As data rate of signal transmission/reception increases inside and outside of communication trunk devices and servers, signal loss in a transmission line increases and waveform of receiving signal may be degraded. A receiving circuit compensates for degraded data, decides an appropriate timing, and restores data and clock.

DECISION FEEDBACK EQUALIZER, RECEIVING CIRCUIT, AND DECISION FEEDBACK EQUALIZATION PROCESSING METHOD

CROSS-REFERENCE TO RELATED APPLICATIONS

This application claims the benefit of priority from Japanese Patent Application No. 2010-175743 filed on Aug. 4, 2010, the entire contents of which are incorporated herein by reference.

BACKGROUND

1. Field

Embodiments discussed herein relate to a decision feedback equalizer, receiving circuit, and a decision feedback equalization processing method.

2. Description of Related Art

As data rate of signal transmission/reception increases inside and outside of communication trunk devices and servers, signal loss in a transmission line increases and waveform of receiving signal may be degraded. A receiving circuit compensates for degraded data, decides an appropriate timing, and restores data and clock.

Related art is disclosed in Japanese Unexamined Patent Application Publication No. 2007-274022, Japanese Unexamined Patent Application Publication No. 08-116297, or the like.

SUMMARY

One aspect of the embodiments, a decision feedback equalizer includes: L equalization calculation circuits to perform an equalization calculation of a first sample of input data for each of M combinations of data decision values of a second sample sampled from the input data before sampling the first sample; a first logic circuit to generate first M logical values by selecting and arranging calculation values of M calculation values calculated by at least one equalization calculation circuit among the L equalization calculation circuits based on a data decision value for a third sample sampled before sampling the first data; and a selection circuit to select one of the first M logical values based on a data decision value for a fourth sample sampled before sampling the third sample, and to output the selected logical value as a data decision value of the first sample.

The object and advantages of the invention will be realized and attained at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 5 illustrates an exemplary logical value table.
FIG. 6 illustrates an exemplary truth table.
FIG. 9 illustrates an exemplary logical value table.
FIG. 10 illustrates an exemplary truth table.
FIG. 13 illustrates an exemplary logical value table.
FIG. 14 illustrates an exemplary truth table.

DESCRIPTION OF EMBODIMENTS

An equalization circuit of a receiving circuit compensates for a degraded signal. A decision feedback equalizer (DFE) decides whether output data is −1 or +1 and feeds back the result. Since the decision feedback equalizer feeds back the decision result, a noise component of an input data signal may be amplified.

In an N-tap decision feedback equalizer, when input data of current sample is $x_n$, the decision result of the input data $x_n$ is $d_n$, and the decision result of a sample taken i samples before is $d_{n-i}$, the calculation described below is performed.

$$y_n = c_0 x_n - c_1 d_{n-1} - c_2 d_{n-2} - \ldots - c_N d_{n-N}$$

Here, $c_0$ to $cN$ indicate a coefficient of an equalization calculation. A decision value is output depending on whether or not $y_n$ is greater than or equal to a certain threshold value, and a decision result $d_n$ of the input data $x_n$ is obtained.

The N-tap decision feedback equalizer performs equalization calculation based on the past decision results $d_{n-1}$ to $d_{n-N}$ including the decision result of the previous sample and decision of the current input data within one cycle. A feedback path of the decision result of the decision feedback equalizer may become a critical path.

A digital circuit may perform signal processing at a high data rate by Speculative-DFE which are provided for demultiplexed L parallel data or are provided due to an increase of the parallel circuits. Selectors for selecting a current decision result based on a past decision result may be cascade-coupled in L stages between L parallel process circuits. A selector operation is performed L times in one cycle, where the number L may be equal to the number of the parallel circuits. The number of the parallel circuits may be the number of the selector operations that are performed within one cycle.

A digital circuit may perform signal processing at a high data rate by dividing a process into a plurality of cycles by inserting a synchronization circuit such as a flip-flop circuit (dividing a process by a pipeline register). For example, a decision result obtained by L selector operations is fed back as an input of the next cycle, so the flip-flop circuit may not be inserted between the selectors.

Figure 1:
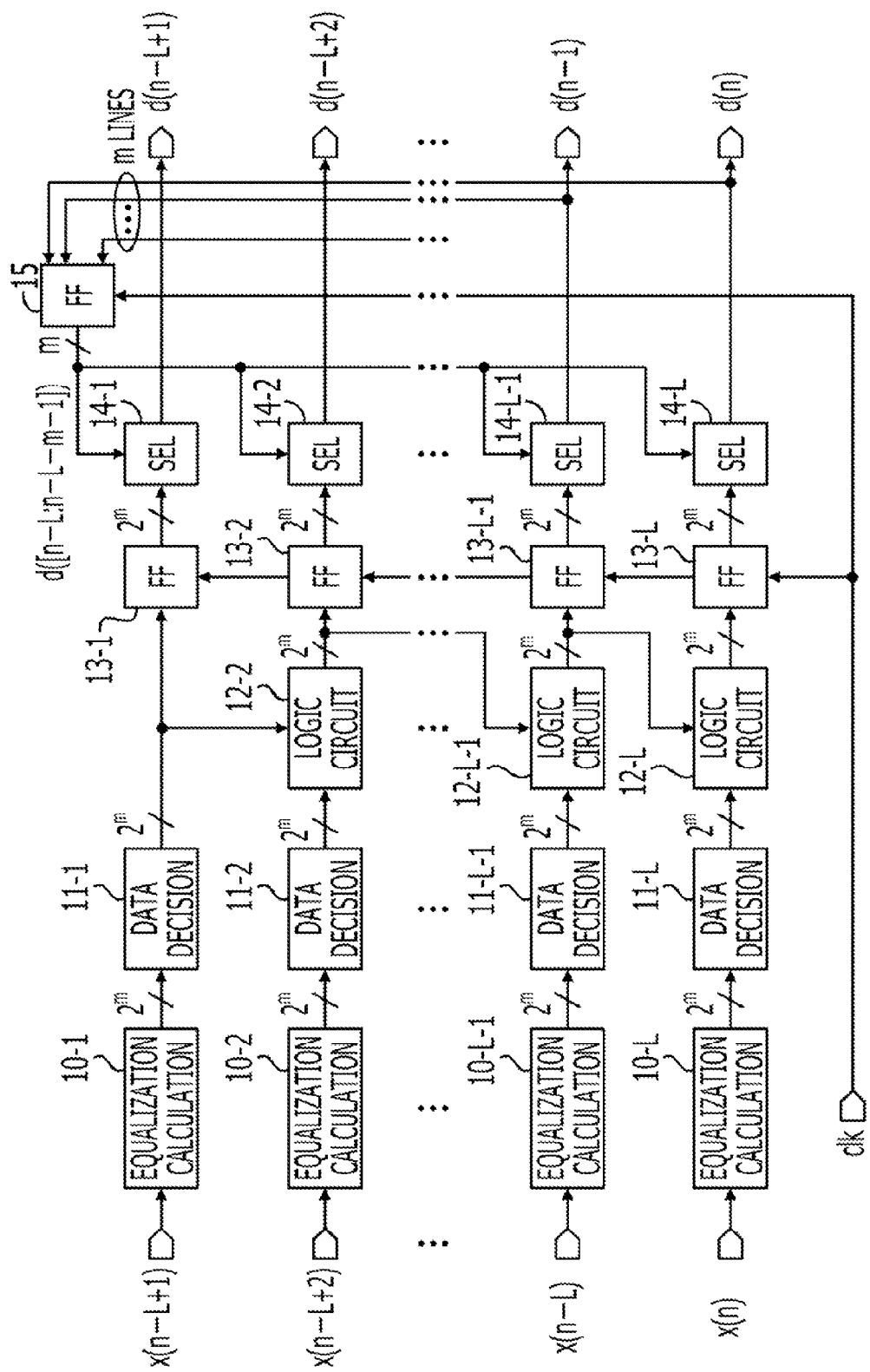
FIG. 1 illustrates an exemplary decision feedback circuit.

FIG. 1 illustrates an exemplary decision feedback equalizer. The decision feedback equalizer illustrated in FIG. 1 may equalize input data of L samples in parallel. The decision feedback equalizer includes equalization calculation circuits 10-1 to 10-L, data decision circuits 11-1 to 11-L, logic circuits 12-2 to 12-L, data holding circuits (FFs) 13-1 to 13-L, selection circuits (SELs) 14-1 to 14-L, and a data holding circuit (FF) 15. The input data x(n−L+1), x(n−L+2), . . . , x(n−1), and x(n) of the L samples may be L sample values aligned on the time axis, and for example, may be data obtained by demultiplexing received data sampled by the receiving circuit. For example, the decision feedback equalizer illustrated in FIG. 1 performs equalization processing in parallel and generates L data decision values d(n−L+1), d(n−L+2), . . . , d(n−1), and, d(n) for the input data of L samples.

The equalization calculation circuits 10-1 to 10-L perform equalization calculation in parallel on the input data of L samples aligned on the time axis. In the equalization calculation, an equalization calculation is performed on each of M combinations among data decision values of one or more samples of the past input data of a target sample, and M calculation values are speculatively obtained. FIG. 1 illustrates an m-tap configuration. The equalization calculation is performed on each of $2^m$ combinations among data decision values of the samples of the past m input data. Each of the equalization calculation circuits 10-1 to 10-L generates $2^m$ equalization calculation results. For example, M illustrated in FIG. 1 may be $2^m$. When the decision value is binary, the number of combinations among data decision values of the samples of the past m input data may be $2^m$. When there are 3 decision values, the number of combinations may be $3^m$.

Each of the data decision circuits 11-1 to 11-L obtains data decision values corresponding to M ($=2^m$) calculation values generated by the equalization calculation circuit. For example, the data decision circuit outputs a value of either −1 or +1 as a decision value depending on whether or not the calculation value is greater than or equal to a certain threshold value, and obtains $2^m$ calculation values by threshold-value-deciding each sample. For example, one of the $2^m$ calculation values threshold-value-decided is selected by the logic circuits 12-2 to 12-L, the data holding circuits 13-1 to 13-L, and the selection circuits 14-1 to 14-L illustrated in FIG. 1, and the data decision value may be obtained.

FIG. 1 illustrates one circuit corresponding to one function. For example, one equalization calculation circuit including an equalization calculation circuit and a data decision circuit is implemented and the one equalization calculation circuit performs the equalization calculation, decides data of the calculation result, and generates $2^m$ calculation values. One equalization calculation function including an equalization calculation function and a data decision function may perform the equalization calculation, decide data of the calculation result, and generate $2^m$ calculation values. The logic circuits 12-2 to 12-L, the data holding circuits 13-1 to 13-L, and the selection circuits 14-1 to 14-L may perform similarly. Functional boundaries between the circuits may be arbitrarily selected. The functional boundaries between the circuits may not indicate physical boundaries between the circuits.

The logic circuits 12-2 to 12-L may include a substantially the same or similar logic configuration. The logic circuit 12-2 selects some calculation values from M ($=2^m$) calculation values for one sample x(n−L+2) according to $2^m$ calculation values for the sample x(n−L+1) previous to the one sample, and generates $2^m$ logical values.

The selection circuits 14-1 to 14-L select one of the input $2^m$ logical values according to data decision values d([n−L: n−L−m−1]) for one or more samples, for example, m samples of input data which are previous to the sample x(n−L+1). The selected logical value is output as data decision values d(n−L+1), d(n−L+2), . . . , d(n−1), and, d(n) for the samples of the input data. The index of "d([n−Ln−L−m−1])" indicates m data decision values from n−L−m−1 to n−L. For example, the $2^m$ logical values input into the selection circuit 14-1 may be the $2^m$ calculation values output from the data decision circuit 11-1. For example, the selection circuit 14-1 selects one calculation value from the $2^m$ calculation values for the sample x(n−L+1) according to the data decision values d([n−L:n−L−m−1]) for the m samples of the input data which are previous to the sample x(n−L+1). The $2^m$ logical values output from the logic circuits 12-2 to 12-L may be respectively input into the selection circuits 14-2 to 14-L.

The data holding circuit 15 may include m flip-flops, and holds data decision values for one or more samples, for example, m samples of the input data which is previous to the sample x(n−L+1). The data holding circuit 15 latches data in synchronization with a pulse edge of a clock signal clk, and may hold the latched data until the next pulse edge. For example, m data decision values d([n−L:n−L−m−1]) among the data decision values d(n−L+1), d(n−L+2), . . . , d(n−1), and d(n) calculated in a certain clock cycle may be latched by the data holding circuit 15 when the next clock cycle starts. The selection circuits 14-1 to 14-L may select based on the data decision values d([n−L:n−L−m−1]) held by the data holding circuit 15 at the next clock cycle.

The data holding circuit 13-1 may be provided between the data decision circuit 11-1 and the selection circuit 14-1, and may hold $2^m$ logical values in synchronization with the clock signal clk. The data holding circuits 13-2 to 13-L may be respectively provided between the logic circuits 12-2 to 12-L and the selection circuits 14-2 to 14-L, and may hold $2^m$ calculation values in synchronization with the clock signal clk. Since the data holding circuits 13-1 to 13-L are provided, a clock cycle for selecting the selection circuits 14-1 to 14-L is separated from the clock cycle for the equalization calculation, the data decision calculation, and the logical operation which are in the previous stage. The selection circuits 14-1 to 14-L may perform the selection in substantially one clock cycle.

One of the $2^m$ calculation values, which are threshold-value-decided by the data decision circuit 11-2, may be selected according to the data decision values d([n−L+1:n−L−m]) of the sample previous to the target sample x (n−L+2) based on a principle of Speculative-DFE. When the data decision value d(n−L+1) of the sample x(n−L+1) previous to the target sample is used for the selection, the output of the selection circuit 14-1 may be supplied to the selection circuit 14-2 as a selection control signal. Therefore, the selection circuit 14-1 and the selection circuit 14-2 may be cascade-coupled to each other. When a plurality of selection circuits are cascade-coupled, parallel process for the input data x(n−L+1), x(n−L+2), . . . , x(n−1), and, x(n) of L samples may not be performed at a speed corresponding to the number of processes performed in parallel.

Information for obtaining the data decision value of the sample x(n−L+1) previous to the target sample may include the data decision values d([n−L:n−L−m−1]) held by the data holding circuit 15 and the input data x(n−L+1) of the target sample. For example, the data decision values d([n−L:n−L−m−1]) and the input data x(n−L+1) of the target sample may be included in the information. The data decision value d(n−L+1) of the sample x(n−L+1) previous to the target sample may include information of the data decision values d([n−L:n−L−m−1]) and the input data x(n−L+1). One of the $2^m$ calculation values, which are obtained by threshold-value-deciding the target sample x(n−L+2), is selected based on the data decision values d([n−L+1:n−L−m]). The data decision values d([n−L+1:n−L−m]) may include information of d(n−L+1) and d([n−L:n−L−m]). The information of d(n−L+1) may be obtained based on d([n−L:n−L−m−1]) and the input data x(n−L+1). The data decision values d([n−L+1:n−L−m]) may include information of d([n−L:n−L−m−1]) and the input data x(n−L+1).

One of the $2^m$ calculation values, which are obtained by threshold-value-deciding the target sample x(n−L+2), is selected based on the information of d([n−L:n−L−m−1]) and the input data x(n−L+1). In FIG. 1, the logic circuit 12-2 selects some of the $2^m$ calculation values, which are obtained by deciding the target sample x(n−L+2) using the threshold value, based on the information of the input data x(n−L+1), and obtains $2^m$ logical values. The selection circuits 14-2 selects one logical value from the $2^m$ logical values based on the information of d([n−L:n−L−m−1]) and outputs the selected logical value as the data decision value.

At the other sample points, the process may be performed similarly. For example, one of the $2^m$ calculation values, which are obtained by threshold-value-deciding the target sample x(n), is selected based on d([n−L:n−L−m−1]) and the input data x(n−L+1) to x(n−1). The logic circuit 12-L selects some of the $2^m$ calculation values of the target sample x(n), which are obtained by threshold-value-deciding, based on the information of the input data x(n−L+1) to x(n−1), and obtains $2^m$ logical values. The selection circuits 14-L select one logical value from the $2^m$ logical values based on the information of d([n−L:n−L−m−1]) and outputs the selected logical value as the data decision value.

Figure 2:
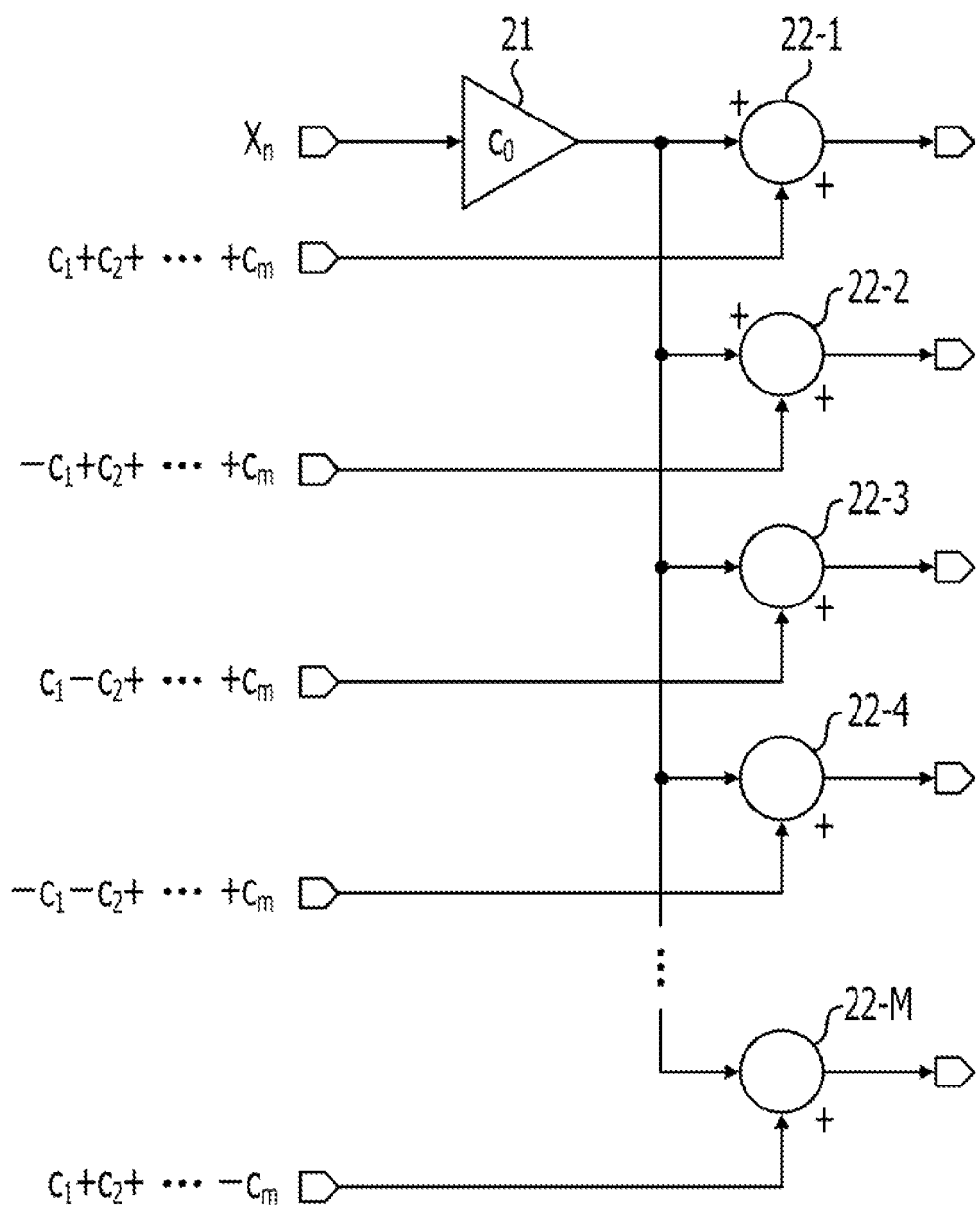
FIG. 2 illustrates an exemplary equalization calculation circuit.

FIG. 2 illustrates an exemplary equalization calculation circuit. Each of the equalization calculation circuits 10-1 to 10-L illustrated in FIG. 1 may include a circuit configuration illustrated in FIG. 2. The equalization calculation circuit illustrated in FIG. 2 includes an integrator 21 and adders 22-1 to 22-M. M may be $2^m$ which is the number of combinations of data decision values of the samples obtained from the past m input data.

When the input data of the current sample is $x_n$, the decision result of the input data $x_n$ is $d_n$, and the decision result of a sample taken i samples before is $d_{n-i}$, an m-tap decision feedback equalizer obtains a value $y_n$ using the following calculation.

$$y_n = c_0 x_n - c_1 d_{n-1} - c_2 d_{n-2} - \ldots - c_m d_{n-m} \quad (1)$$

The $y_n$ is calculated for each of $2^m$ combinations of the data decision values for the input data of the past m samples. The integrator 21 multiplies the input data $x_n$ by $c_0$ to calculate the first term ($c_0 x_n$). For example, the adder 22-1 adds $c_1 + c_2 + \ldots c_m$ to $c_0 x_n$ to calculate $y_n$ when $d_{n-1}$ to $d_{n-m}$ are all −1 in the formula (1).

Figure 3:
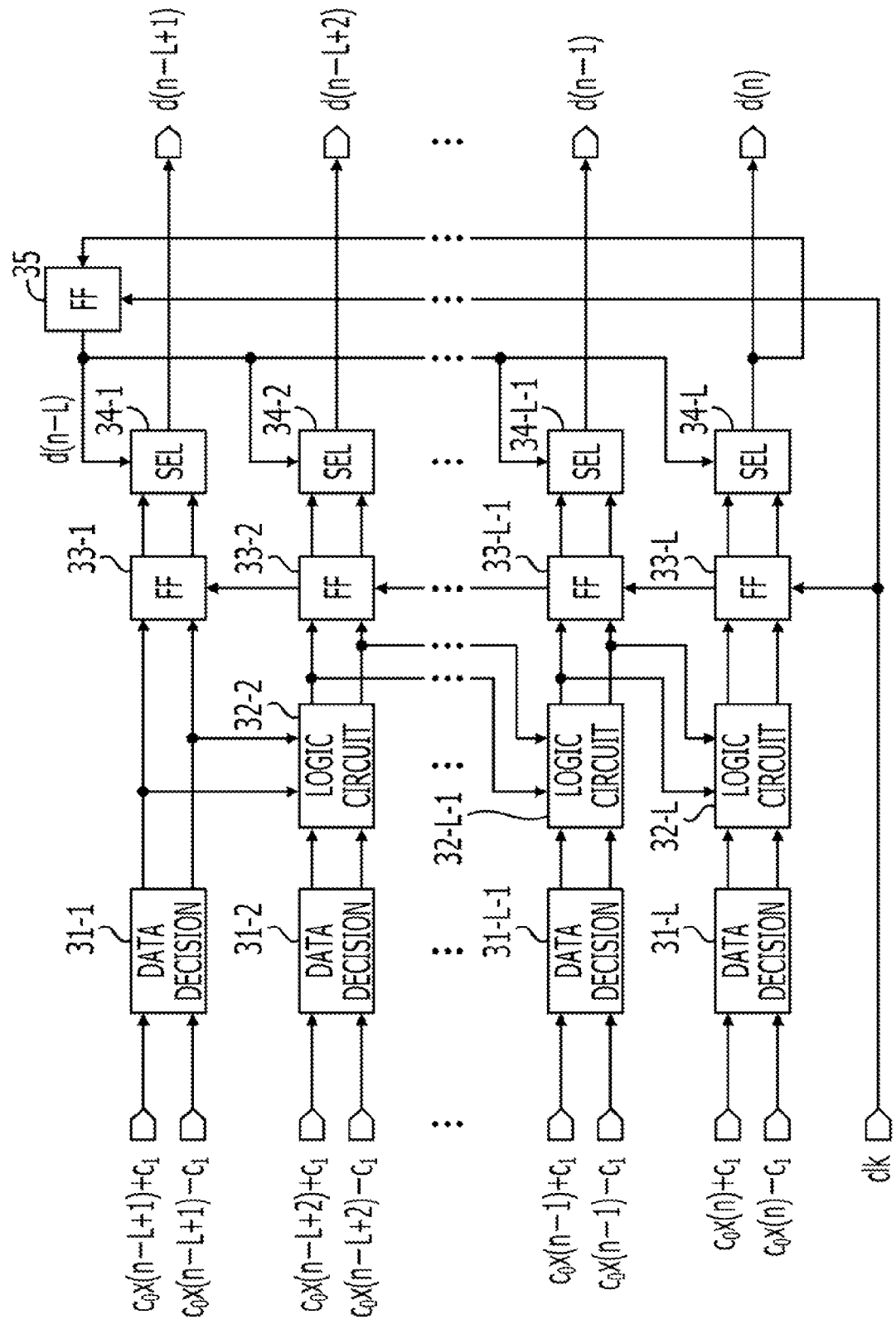
FIG. 3 illustrates an exemplary decision feedback equalizer.

FIG. 3 illustrates an exemplary decision feedback equalizer. The decision feedback equalizer illustrated in FIG. 3 may be the decision feedback equalizer of one-tap configuration illustrated in FIG. 1. The decision feedback equalizer illustrated in FIG. 3 includes data decision circuits 31-1 to 31-L, logic circuits 32-2 to 32-L, data holding circuits (FFs) 33-1 to 33-L, selection circuits (SELs) 34-1 to 34-L, and a data holding circuit (FF) 35. In FIG. 3, portions corresponding to the equalization calculation circuits 10-1 to 10-L illustrated in FIG. 1 may not be illustrated. Operations of the logic circuits 32-2 to 32-L, the data holding circuits 33-1 to 33-L, the selection circuits 34-1 to 34-L, and the data holding circuit 35 are substantially the same as or similar to those of the logic circuits, the data holding circuits, the selection circuits, and the data holding circuit illustrated in FIG. 1. One data decision value d(n−L), two calculation values, and two logical values illustrated in FIG. 3 may correspond to m data decision values d([n−L+1:n−L−m]), $2^m$ calculation values, and $2^m$ logical values.

For example, two calculation values of the sample x(n−L+1) before the threshold-value-decision by the threshold value may correspond to $c_0 x(n-L+1) + c_1$ and $c_0 x(n-L+1) - c_1$.

Figure 4:
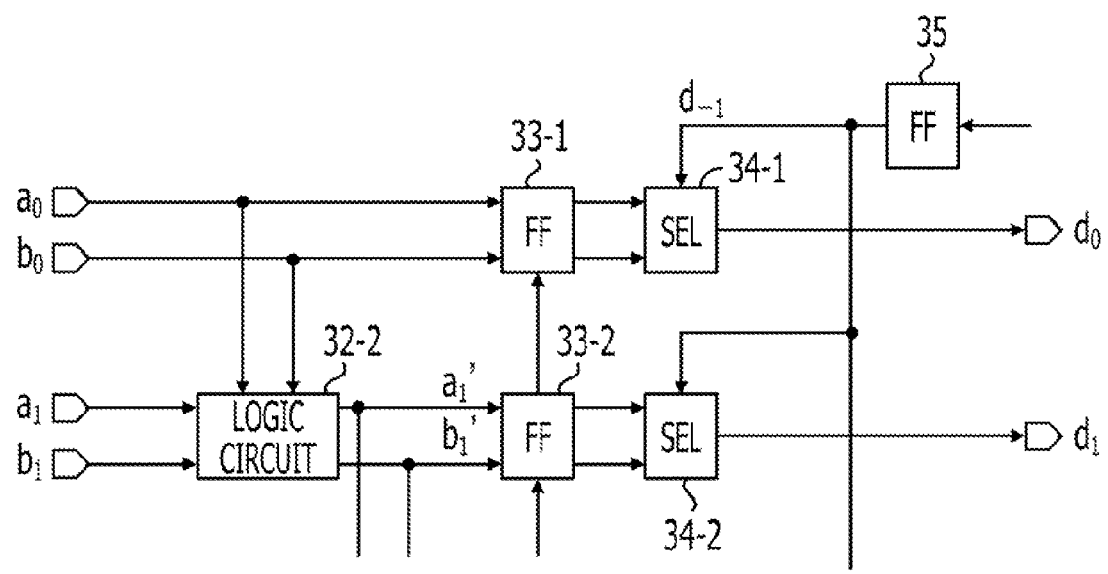
FIG. 4 illustrates an exemplary logical operation or an example selection.

FIG. 4 illustrates an exemplary logical operation or an exemplary selection. The logical operation or the selection illustrated in FIG. 4 may correspond to the logical operation and the selection of the first row circuits and the second row circuits of the decision feedback equalizer illustrated in FIG. 3. The $d_{-1}$, $d_0$, and $d_1$ illustrated in FIG. 4 may correspond to the data decision values d(n−L), d(n−L+1), and d(n−L+2). The data decision value of the first row circuits of the decision feedback equalizer may be $d_0$ and the data decision value of the second row circuits may be $d_1$. The $a_0$ and $b_0$ illustrated in FIG. 4 may correspond to the two calculation values which are threshold-value-decided by the data decision circuit 31-1 illustrated in FIG. 3. The $a_1$ and $b_1$ illustrated in FIG. 4 may correspond to the two calculation values which are threshold-value-decided by the data decision circuit 31-2 illustrated in FIG. 3. The $a_0$ and $b_0$ illustrated in FIG. 4 may correspond to the two calculation values which are threshold-value-decided by the first row circuit of the decision feedback equalizer illustrated in FIG. 3. The $a_1$ and $b_1$ illustrated in FIG. 4 may correspond to the two calculation values which are threshold-value-decided by the second row circuit of the decision feedback equalizer illustrated in FIG. 3. The $a_1'$ and $b_1'$ illustrated in FIG. 4 may correspond to the two logical values output from the logic circuit 32-2 illustrated in FIG. 3.

FIG. 5 illustrates an exemplary logical value table. The logical value table illustrated in FIG. 5 may be a logical value table indicating the data decision calculations in the first row circuits and the second row circuits of the decision feedback equalizer illustrated in FIG. 4. In the logical value table, the values −1 and +1 obtained by threshold-value-deciding or data-deciding are illustrated 0 and 1 for the sake of convenience. The selection circuits 34-1 and 34-2 illustrated in FIG. 4 select the upper input when $d_{-1}$ is 0 and select the lower input when $d_{-1}$ is 1.

The first column and the second column of the logical value table illustrated in FIG. 5 illustrate the combination of the two calculation values $a_0$ and $b_0$ threshold-value-decided by the first row circuits of the decision feedback equalizer. The third column illustrates the data decision value $d_0$ in the first row circuits of the decision feedback equalizer. When $a_0$ and $b_0$ are 0, the data decision value $d_0$ may be 0 regardless of the value of $d_{-1}$. When $a_0$ and $b_0$ are 1, the data decision value $d_0$ may be 1 regardless of the value of $d_{-1}$. When $a_0$ is 0 and $b_0$ is 1, if the $d_{-1}$ is 0, $a_0=0$ may be selected and the data decision value $d_0$ may be 0, and if the $d_{-1}$ is 1, $b_0=1$ may be selected and the data decision value $d_0$ may be 1. The data decision value $d_0$ may be substantially the same as the data decision value $d_{-1}$ of the previous sample. When $a_0$ is 1 and $b_0$ is 0, if the $d_{-1}$ is 0, $a_0=1$ may be selected and the data decision value $d_0$ may be 1, and if the $d_{-1}$ is 1, $b_0=0$ may be selected and the data decision value $d_0$ may be 0. The data decision value $d_0$ may be substantially the same as the inverted value of the data decision value $d_{-1}$ of the previous sample. The data decision value $d_0$ in the first row circuits of the decision feedback equalizer may correspond to the values illustrated in the third column of the logical value table.

The fifth column of the logical value table illustrated in FIG. 5 illustrates the data decision value $d_1$ when the data decision value $d_{-1}$ is 0. When the data decision value $d_{-1}$ is 0, the output $a_1'$ of the logic circuit 32-2 may correspond to the values in the fifth column since the selection circuit 34-2 selects $a_1'$. The sixth column illustrates the data decision value $d_1$ when the data decision value $d_{-1}$ is 1. When the data decision value $d_{-1}$ is 1, the output $b_1'$ of the logic circuit 32-2 may correspond to the values in the sixth column since the selection circuit 34-2 selects $b_1'$.

When $a_0$ is 0 and $b_0$ is 0 as illustrated in the first row of the logical value table, $d_0$ may be 0. Since the data decision value $d_0$ of the previous sample, for example, the data decision value $d_0$ of the first row circuits of the decision feedback equalizer is 0, the calculation value $a_1$, which is threshold-value-decided, may be selected as the data decision value $d_1$ of the second row circuits of the decision feedback equalizer based on the principle of Speculative-DFE. When $a_0$ is 1 and $b_0$ is 1 as illustrated in the fourth row of the logical value table, $d_0$ may be 1. Since the data decision value $d_0$ of the previous sample, for example, the data decision value $d_0$ of the first row circuits of the decision feedback equalizer is 1, the calculation value $b_1$, which is threshold-value-decided, may be selected as the data decision value $d_1$ of the second row circuits of the decision feedback equalizer based on the principle of Speculative-DFE. When $a_0$ is 0 and $b_0$ is 1 as illustrated in the second row of the logical value table, $d_0$ may be substantially the same as $d_{-1}$. Since the data decision value of the previous sample, for example, the data decision value of the first row circuits of the decision feedback equalizer is substantially the same as $d_{-1}$, as the data decision value $d_1$ of the second row circuits of the decision feedback equalizer, $a_1$ may be selected when $d_{-1}$ is 0 and $b_1$ may be selected when $d_{-1}$ is 1, based on the principle of Speculative-DFE. When $a_0$ is 1 and $b_0$ is 0 as illustrated in the third row of the logical value table, $d_0$ may be substantially the same as the inverted value of $d_{-1}$. Since the data decision value of the previous sample, for example, the data decision value of the first row circuits of the decision feedback equalizer is substantially the same as the inverted value of $d_{-1}$, as the data decision value $d_1$ of the second row circuits of the decision feedback equalizer, $b_1$ may be selected when $d_{-1}$ is 0, and $a_1$ may be selected when $d_{-1}$ is 1. The data decision value $d_1$ in the second row circuits of the decision feedback equalizer may correspond to the values illustrated in the fifth and the sixth columns of the logical value table.

Figure 6:
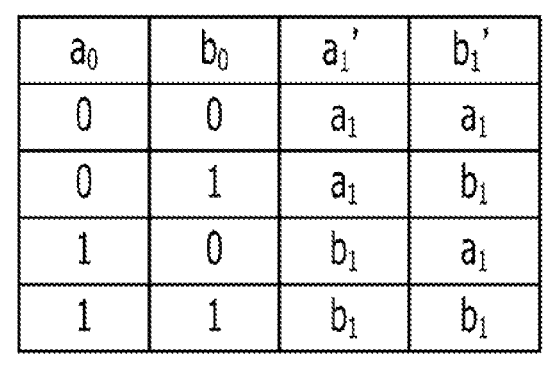

The output $a_1'$ of the logic circuit 32-2 may correspond to the values in the fifth column of the logical value table, and the output $b_1'$ of the logic circuit 32-2 may be the values in the sixth column of the logical value table. FIG. 6 illustrates an exemplary truth table. The truth table illustrated in FIG. 6 may correspond to the input/output relationship of the logic circuit 32-2. The first and the second columns of the truth table illustrated in FIG. 6 illustrate the combination of the values of $a_0$ and $b_0$ input into the logic circuit 32-2 from the first row circuits of the decision feedback equalizer illustrated in FIG. 3. The third and the fourth columns of the truth table illustrated in FIG. 6 illustrate the two logical values $a_1'$ and $b_1'$ output from the logic circuit 32-2. The outputs may correspond to the combination of the two calculation values $a_1$ and $b_1$, which are threshold-value-decided and are input into the logic circuit 32-2 from the second row circuits of the decision feedback equalizer. In the first row of the truth table, two $a_1$ values are selected from the two calculation values $a_1$ and $b_1$. For example, in the third row of the truth table, a combination of $b_1$ and $a_1$ is selected from the two calculation values $a_1$ and $b_1$.

Figure 7:
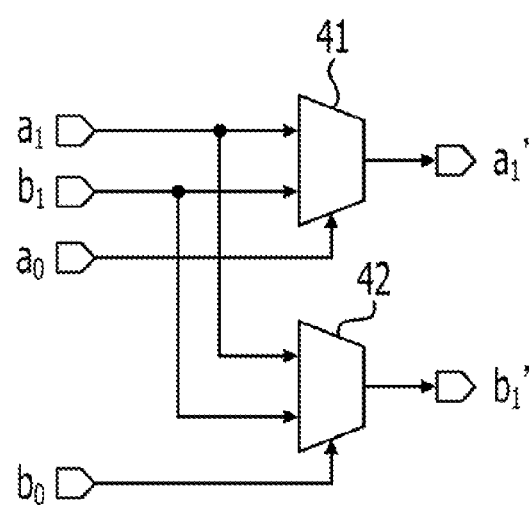
FIG. 7 illustrates an exemplary logic circuit.

FIG. 7 illustrates an exemplary logic circuit. The logic circuit illustrated in FIG. 7 may correspond to the logic circuit 32-2 illustrated in FIG. 3. The logic circuit 32-2 illustrated in FIG. 7 includes selection circuits 41 and 42. The selection circuit 41 selects at least one of $a_1$ and $b_1$ according to $a_0$, and outputs the selected one as $a_1'$. The selection circuit 42 selects at least one of $a_1$ and $b_1$ according to $b_0$, and outputs the selected one as $b_1'$. The logic circuit illustrated in FIG. 7 may perform a logical operation of the truth table illustrated in FIG. 6.

Figure 8:
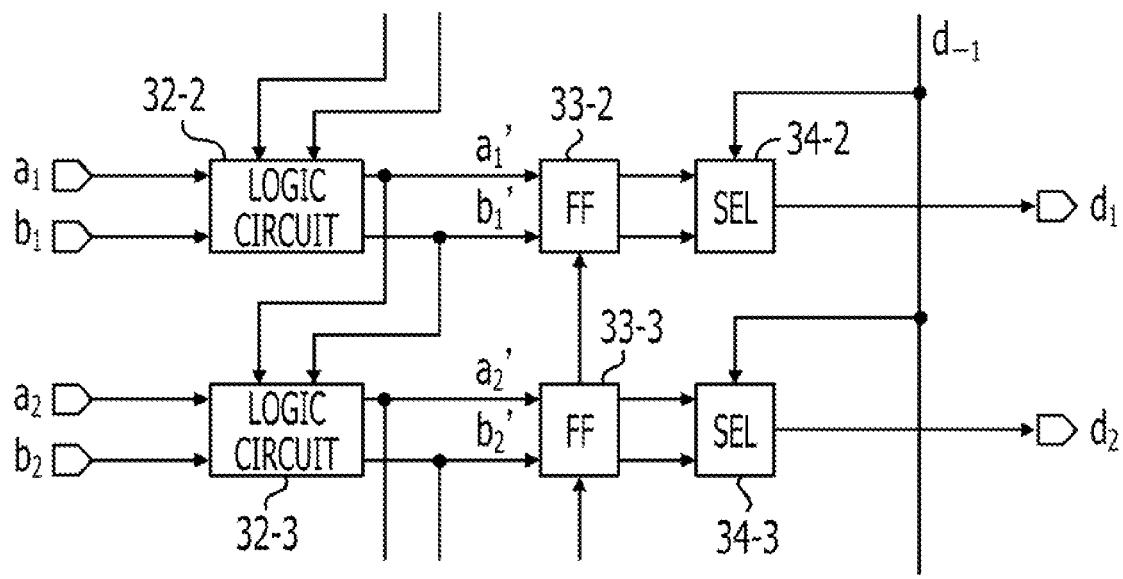
FIG. 8 illustrates an exemplary logical operation or an exemplary selection.

FIG. 8 illustrates an exemplary logical operation or an exemplary selection. The logical operation and the selection illustrated in FIG. 8 may correspond to the logical operation and the selection, respectively, of the second row circuits and the third row circuits of the decision feedback equalizer illustrated in FIG. 3. In FIG. 3, the third row circuits may not be illustrated. In FIG. 8, $d_{-1}$, $d_1$, and $d_2$ illustrated in FIG. 3 may correspond to the data decision values $d(n-L)$, $d(n-L+2)$, and $d(n-L+3)$ of the decision feedback equalizer. The data decision value in the second row circuits of the decision feedback equalizer may be $d_1$, and the data decision value in the third row circuits may be $d_2$. In FIG. 8, the two calculation values, which are threshold-value-decided by the second row circuits of the decision feedback equalizer, may be $a_1$ and $b_1$, and the two calculation values, which are threshold-value-decided by the third row circuits of the decision feedback equalizer may be $a_2$ and $b_2$. The two logical values output from the logic circuit 32-2 may be $a_1'$ and $b_1'$, and the two logical values output from the logic circuit 32-3 may be $a_2'$ and $b_2'$.

FIG. 9 illustrates an exemplary logical value table. The logical value table illustrates in FIG. 9 may be correspond to the data decision calculation in the second row circuits and the third row circuits of the decision feedback equalizer illustrated in FIG. 8. In the logical value table, 0 and 1 indicate the values −1 and +1 obtained by threshold-value-deciding or data-deciding. The selection circuits 34-2 and 34-3 illustrated in FIG. 8 may select the upper input when $d_{-1}$ is 0, and may select the lower input when $d_{-1}$ is 1.

The first column and the second column of the logical value table in FIG. 9 illustrate the combination of the two logical values $a_1'$ and $b_1'$ output from the logic circuit 32-2 in the second row circuits of the decision feedback equalizer. The third column of the logical value table illustrates the data decision value $d_1$ in the second row circuits of the decision feedback equalizer. In a substantially similar manner as in FIG. 5, the data decision value $d_1$ in the second row circuits of the decision feedback equalizer may correspond to the values illustrated in the third column of the logical value table.

The fifth column of the logical value table illustrated in FIG. 9 illustrates the data decision value $d_2$ when the data decision value $d_{-1}$ is 0. When the data decision value $d_{-1}$ is 0, the values in the fifth column may correspond to the output $a_2'$ of the logic circuit 32-3 since the selection circuit 34-3 selects $a_2'$. The sixth column illustrates the data decision value $d_2$ when the data decision value $d_{-1}$ is 1. When the data decision value $d_{-1}$ is 1, the values in the sixth column may correspond to the output $b_2'$ of the logic circuit 32-3 since the selection circuit 34-3 selects $b_2'$.

Figure 10:
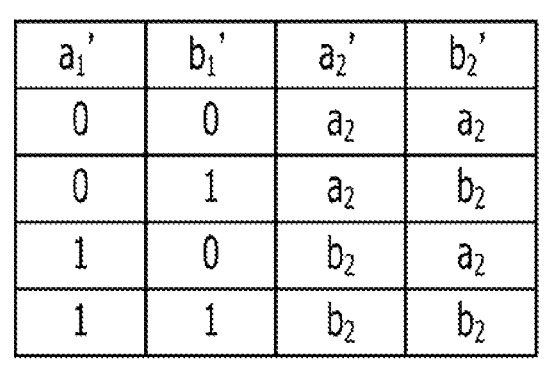

Similarly as in FIG. 5, the data decision value $d_2$ in the third row circuits of the decision feedback equalizer may correspond to the values illustrated in the fifth and sixth columns of the logical value table in FIG. 9. The values in the fifth column of the logical value table may correspond to the output $a_2'$ of the logic circuit 32-3, and the values in the sixth column of the logical value table may correspond to the output $b_2'$ of the logic circuit 32-3. FIG. 10 illustrates an exemplary truth table. The truth table illustrated in FIG. 10 may correspond to the input/output relationship of the logic circuit 32-3. The values in the first and the second columns of the truth table illustrated in FIG. 10 indicate the combination of $a_1'$ and $b_1'$ input into the logic circuit 32-3 from the second row circuits of the decision feedback equalizer. The third and the fourth columns of the truth table illustrated in FIG. 10 indicate the two logical values $a_2'$ and $b_2'$ output from the logic circuit 32-3. The outputs may correspond to the combination of the two calculation values $a_2$ and $b_2$ which are threshold-value-decided and are input into the logic circuit 32-3 from the third row circuits of the decision feedback equalizer. For example, in the first row of the truth table, two $a_2$ values among the two calculation values $a_2$ and $b_2$ are output. For example, in the third row of the truth table, a combination of $b_2$ and $a_2$ among the two calculation values $a_2$ and $b_2$ is outputted.

Figure 11:
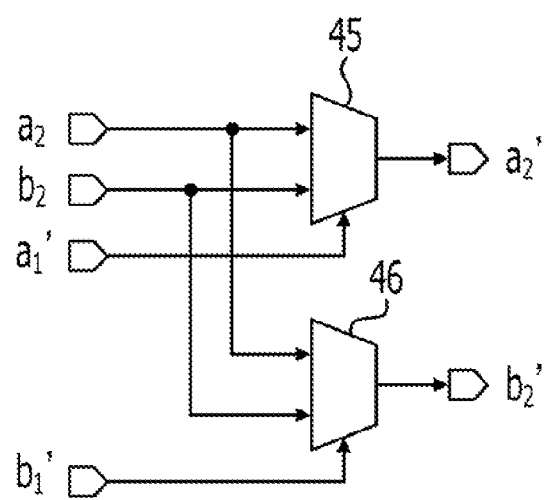
FIG. 11 illustrates an exemplary logic circuit.

FIG. 11 illustrates an exemplary logic circuit. The logic circuit 32-3 illustrated in FIG. 11 includes selection circuits 45 and 46. The selection circuit 45 selects at least one of $a_2$ and $b_2$ according to $a_1'$, and outputs the selected one as $a_2'$. The selection circuit 46 selects at least one of $a_2$ and $b_2$ according to $b_1'$, and outputs the selected one as $b_2'$. For example, the logic circuit may perform a logical operation of the truth table illustrated in FIG. 10. The logic circuit 32-3 illustrated in FIG. 11 selects calculation values from the two calculation values $a_2$ and $b_2$ of the sample of the third row circuits according to two logical values $a_1'$ and $b_1'$ generated by the logic circuit 32-2, and generates two logical values $a_2'$ and $b_2'$. The selection circuit 34-3 illustrated in FIG. 8 selects one of the two logical values $a_2'$ and $b_2'$ generated by the logic circuit 32-3 according to the data decision value $d_{-1}$ of the input data of the previous sample, and outputs the selected one as the data decision value $d_2$ of the input data. The logic configuration or the circuit configuration in the third and the following rows of the decision feedback equalizer may be substantially the same as or similar to that of the second row logic circuit.

Figure 12:
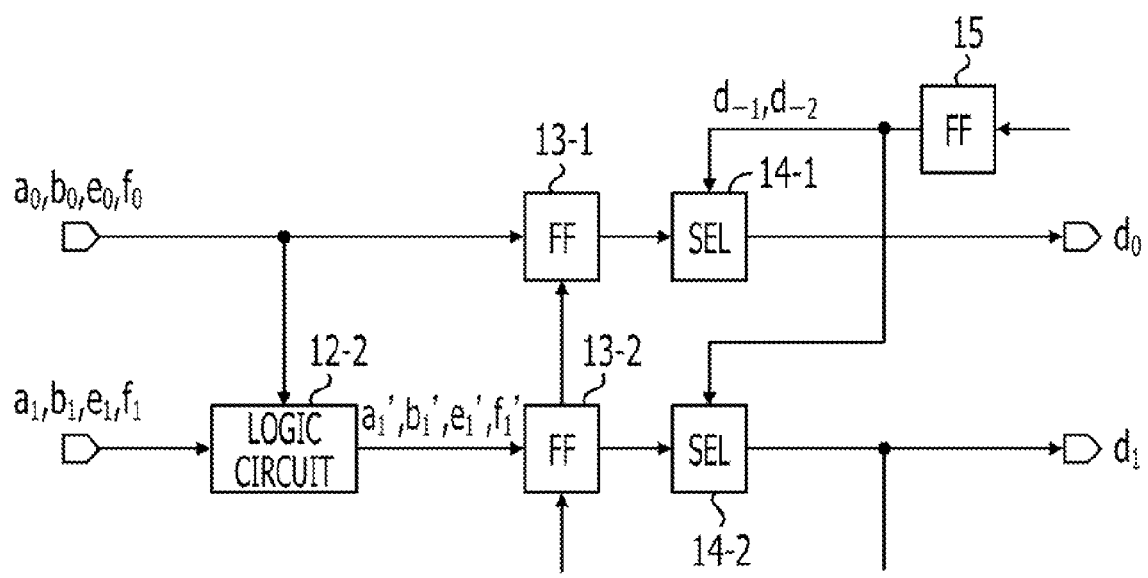
FIG. 12 illustrates an exemplary logical operation or a selection.

FIG. 12 illustrates an exemplary logical operation and a selection. For example, FIG. 12 may illustrate the logical operation and the selection in the first row circuits and the second row circuits when the decision feedback equalizer illustrated in FIG. 1 has a two-tap configuration. The $d_{-2}$, $d_{-1}$, $d_0$, and $d_1$ illustrated in FIG. 12 may respectively correspond to the data decision values $d(n-L-1)$, $d(n-L)$, $d(n-L+1)$, and $d(n-L+2)$. The data decision value of the first row circuits of the decision feedback equalizer may be $d_0$ and the data decision value of the second row circuits may be $d_1$. The $a_0$, $b_0$, $e_0$, and $f_0$ illustrated in FIG. 12 may respectively correspond to the four calculation values which are threshold-value-decided by the data decision circuit 11-1 when the decision feedback equalizer illustrated in FIG. 1 has a two-tap configuration. The four calculation values which are threshold-value-decided by the data decision circuit 11-2 when the decision feedback equalizer has a two-tap configuration may be $a_1$, $b_1$, $e_1$, and $f_1$. For example, the four calculation values threshold-value-decided in the first row circuits of the decision feedback equalizer may be $a_0$, $b_0$, $e_0$, and $f_0$, and the four calculation values threshold-value-decided in the second row circuits of the decision feedback equalizer may be $a_1$, $b_1$, $e_1$, and $f_1$. The four logical values output from the logic circuit 12-2 when the decision feedback equalizer has a two-tap configuration may be $a_1'$, $b_1'$, $e_1'$, and $f_1'$.

Figure 13:
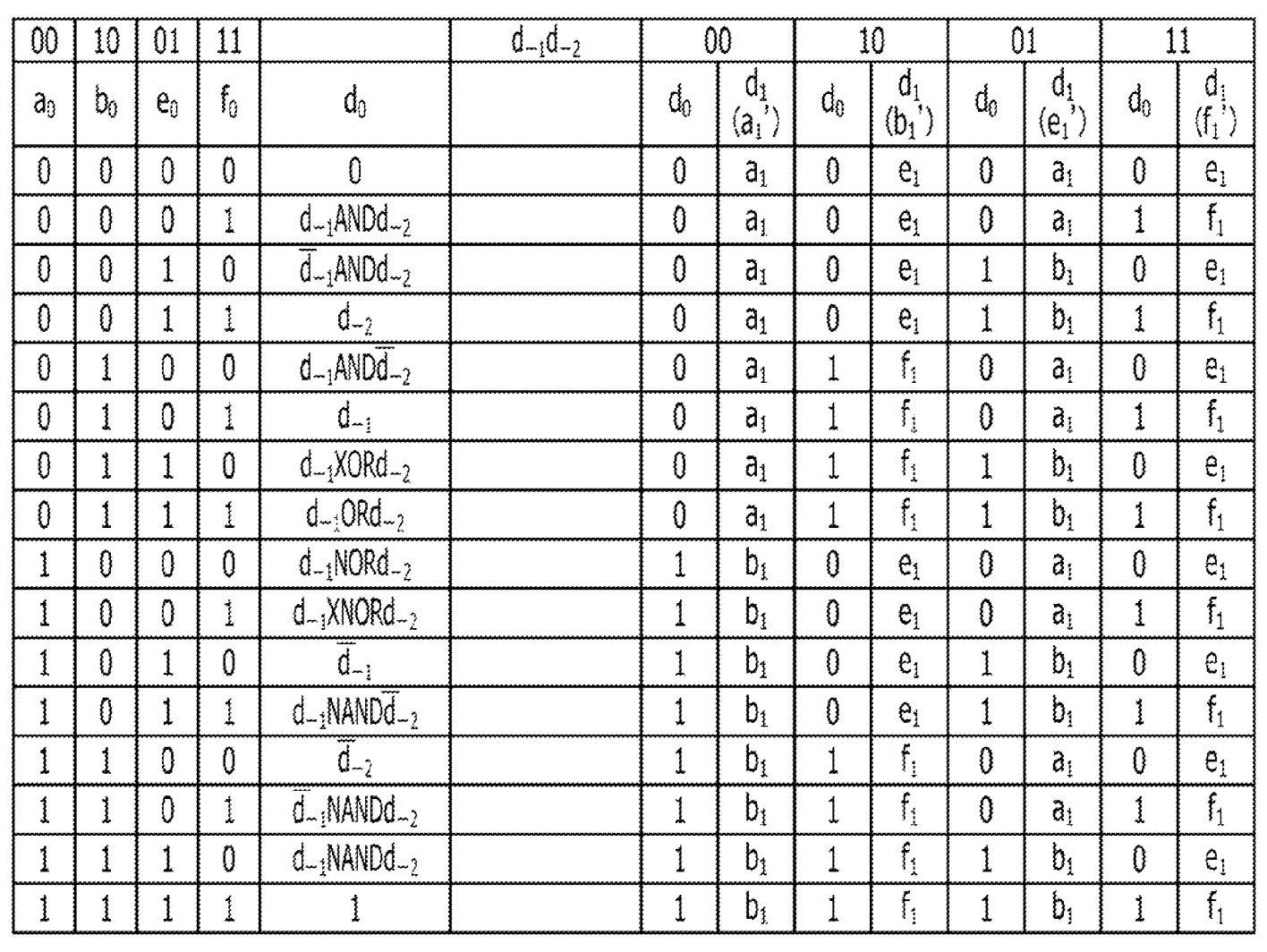

FIG. 13 illustrates an exemplary logical value table. The logical value table illustrated in FIG. 13 may correspond to the calculation of the data decision values in the first row circuits and the second row circuits of the decision feedback equalizer illustrated in FIG. 12. In the logical value table illustrated in FIG. 13, 0 and 1 may correspond to the values −1 and +1 obtained by threshold-value-deciding or data-deciding. For example, the selection circuits 14-1 and 14-2 illustrated in FIG. 12 select $a_x$ when $d_{-1}=d_{-2}=0$, select $b_x$ when $d_{-1}=1$ and $d_{-2}=0$, select $e_x$ when $d_{-1}=0$ and $d_{-2}=1$, and select $f_x$ when $d_{-1}=d_{-2}=1$. x may be 0 or 1.

The first to the fourth columns of the logical value table illustrated in FIG. 13 illustrate the combination of the four calculation values $a_0$, $b_0$, $e_0$, and $f_0$ which are threshold-value-decided in the first row circuits of the decision feedback equalizer. The fifth column illustrated the data decision value $d_0$ in the first row circuits of the decision feedback equalizer. When $a_0$, $b_0$, $e_0$, and $f_0$ are 0, the data decision value $d_0$ may be 0 regardless of the values of $d_{-1}$ and $d_{-2}$. When $a_0$, $b_0$, $e_0$, and $f_0$ are 1, the data decision value $d_0$ may be 1 regardless of the values of $d_{-1}$ and $d_{-2}$. For example, when $a_0$, $b_0$, $e_0$, and $f_0$ are 0, 1, 0, and 0 respectively, $a_0$ may be 0 if $d_{-1}=d_{-2}=0$, $b_0$ may be 1 if $d_{-1}=1$ and $d_{-2}=0$, $e_0$ may be 0 if $d_{-1}=0$ and $d_{-2}=1$, and $f_0$ may be 0 if $d_{-1}=d_{-2}=1$. The data decision value 0 may be obtained by a logical AND operation of $d_{-1}$ and the inverted value of $d_{-2}$. A value illustrated in the fifth column of the logical value table, for example, a logical expression may be obtained as the data decision value $d_0$ in the first row circuits of the decision feedback equalizer.

The seventh and eighth columns illustrated in FIG. 13 illustrate the data decision values $d_0$ and $d_1$ when the data decision values $d_{-1}$ and $d_{-2}$ are 0. When the data decision values $d_{-1}$ and $d_{-2}$ are 0, the values in the eighth column may be the output $a_1'$ of the logic circuit 12-2 since the selection circuit 14-2 selects $a_1$. The ninth and tenth columns illustrate the data decision values $d_0$ and $d_1$ when the data decision value $d_{-1}$ is 1 and $d_{-2}$ is 0. When the data decision value $d_{-1}$ is 1 and $d_{-2}$ is 0, the output $b_1'$ of the logic circuit 12-2 may be the values in the tenth column since the selection circuit 14-2 selects $b_1'$. The eleventh and twelfth columns illustrate the data decision values $d_0$ and $d_1$ when the data decision value $d_{-1}$ is 0 and $d_{-2}$ is 1. When the data decision value $d_{-1}$ is 0 and $d_{-2}$ is 1, the output $e_1'$ of the logic circuit 12-2 may be the values in the twelfth column since the selection circuit 14-2 selects $e_1'$. The thirteenth and fourteenth columns illustrate the data decision values $d_0$ and $d_1$ when the data decision values $d_{-1}$ and $d_{-2}$ are 1. When the data decision values $d_{-1}$ and $d_{-2}$ are 1, the output $f_1'$ of the logic circuit 12-2 may be the values in the fourteenth column since the selection circuit 14-2 selects $f_1'$.

When $a_0$, $b_0$, $e_0$, and $f_0$ are 0, for example, when the first row of the logical value table is applied, $d_0$ may be 0. In the eighth column, for example, in $a_1'$, the threshold-value-decided calculation value $a_1$ may be selected as the data decision value $d_1$ in the second row circuits of the decision feedback equalizer since $d_0$ is 0 and $d_{-1}$ is 0. This may be the same in the twelfth column, for example, in $e_1'$. Since $d_0$ is 0 and $d_{-1}$ is 1 in the tenth column, for example, in $b_1'$, the threshold-value-decided calculation value $e_1$ may be selected as the data decision value $d_1$ in the second row circuits of the decision feedback equalizer. This may be the same in the fourteenth column, for example, in $f_1'$. This may be the same when $a_0$, $b_0$, $e_0$, and $f_0$ are 1, for example, when the sixteenth row of the logical value table is applied.

When $a_0$, $b_0$, $e_0$, and $f_0$ are 0, 1, 0, 0 respectively, for example, when the fifth row of the logical value table is applied, $d_0$ may be 0 in the eighth column, for example, in $a_1'$. Since $d_0$ is 0 and $d_{-1}$ is 0 in the eighth column, the threshold-value-decided calculation value $a_1$ may be selected as the data decision value $d_1$ in the second row circuits of the decision feedback equalizer. In the tenth column, for example, in $b_1'$, $d_0$ may be 1. Since $d_0$ is 1 and $d_{-1}$ is 1 in the tenth column, the threshold-value-decided calculation value $f_1$ may be selected as the data decision value $d_1$ in the second row circuits of the decision feedback equalizer. In the twelfth column, for example, in $e_1'$, $d_0$ may be 0. Since $d_0$ is 0 and $d_{-1}$ is 0 in the twelfth column, the threshold-value-decided calculation value $a_1$ may be selected as the data decision value $d_1$ in the second row circuits of the decision feedback equalizer. Further, in the fourteenth column, for example, in $f_1'$, $d_0$ may be 0. Since $d_0$ is 1 and $d_{-1}$ is 1 in the fourteenth column, the threshold-value-decided calculation value $e_1$ may be selected as the data decision value $d_1$ in the second row circuits of the decision feedback equalizer.

As the data decision value $d_1$ in the second row circuits of the decision feedback equalizer, a value illustrated in the eighth, the tenth, the twelfth, or the fourteenth column of the logical value table may be used. The outputs $a_1'$, $b_1'$, $c_1'$, and $d_1'$ of the logic circuit 12-2 may respectively correspond to the values illustrated in the eighth, the tenth, the twelfth, and the fourteenth columns. FIG. 14 illustrates an exemplary truth table. The truth table illustrated in FIG. 14 may correspond to the input/output relationship of the logic circuit 12-2. The first to the fourth columns of the truth table illustrated in FIG. 14 may correspond to the combination of $a_0$, $b_0$, $e_0$, and $f_0$ input into the logic circuit 12-2 from the first row circuits of the decision feedback equalizer. The fifth to the eighth columns of the truth table illustrated in FIG. 14 may correspond to the four logical values $a_1'$, $b_1'$, $c_1'$, and $d_1'$ output from the logic circuit 12-2. The outputs may be selected from the four calculation values $a_1$, $b_1$, $e_1$, and $f_1$ which are threshold-value-decided and are input into the logic circuit 12-2 from the second row circuits of the decision feedback equalizer.

Figure 15:
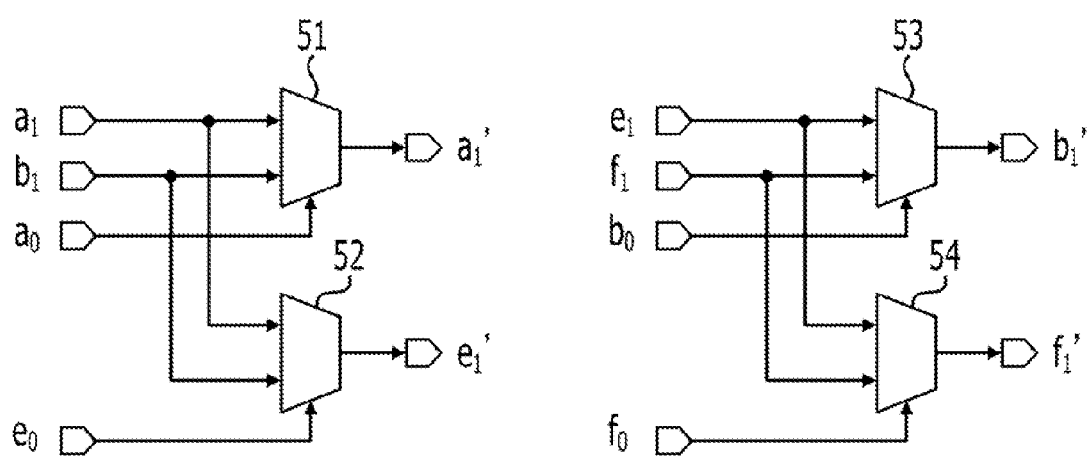
FIG. 15 illustrates an exemplary logic circuit.

FIG. 15 illustrates an exemplary logic circuit. The logic circuit illustrated in FIG. 15 may correspond to the logic circuit 12-2 illustrated in FIG. 1. The logic circuit illustrated in FIG. 15 includes selection circuits 51 to 54. The selection circuit 51 selects at least one of $a_1$ and $b_1$ according to $a_0$, and outputs the selected one as $a_1'$. The selection circuit 52 selects at least one of $a_1$ and $b_1$ according to $e_0$, and outputs the selected one as $e_1'$. The selection circuit 53 selects at least one of $e_1$ and $f_1$ according to $b_0$, and outputs the selected one as $b_1'$. The selection circuit 54 selects at least one of $e_1$ and $f_1$ according to $f_0$, and outputs the selected one as $f_1'$.

By performing the above operation on the third row circuits of the decision feedback equalizer, as illustrated in FIGS. 8 to 11, the logic circuit in the third row of the decision feedback equalizer may be implemented in substantially the same manner as the logic circuit in the second row of the decision feedback equalizer. The logic configuration and the circuit configuration of the logic circuit in the third row of the decision feedback equalizer may be substantially the same as or similar to those of the logic circuit in the second row. The logic configuration and the circuit configuration of the logic circuits in the fourth row and the following rows may also be substantially the same as or similar to those of the logic circuit in the second row of the decision feedback equalizer.

Figure 16:
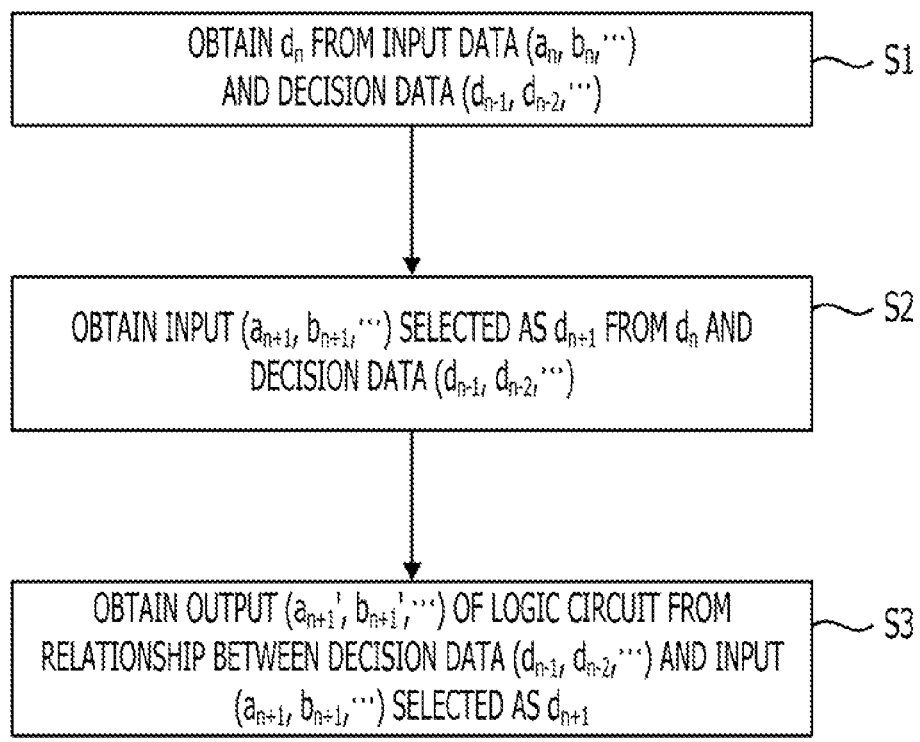
FIG. 16 illustrates an exemplary operation of a logic circuit.

FIG. 16 illustrates an exemplary operation of a logic circuit. In an operation S1, the decision data $d_n$ of the sample previous to the target sample is obtained based on the input data $a_n$, $b_n$, and so forth of the previous sample and the decision data $d_{n-1}$, $d_{n-2}$, and so forth of the samples older than the previous sample. For example, $d_n$ for each combination of $a_n$, $b_n$, and so forth may be obtained. In an operation S2, the input data $a_{n+1}$, $b_{n+1}$, and so forth, which are selected as the decision data $d_n+1$ of the target sample, are obtained based on the decision data $d_n$ of the previous sample and the decision data $d_{n-1}$, $d_{n-2}$, and so forth which are older than $d_n$. For example, the selection input data $a_{n+1}$, $b_{n+1}$, and so forth for the combination of $d_{n-1}$, $d_{n-2}$, and so forth are obtained for each combination of $a_n$, $b_n$, and so forth.

In an operation S3, the outputs $a_{n+1}'$, $b_{n+1}'$, and so forth of the logic circuit are obtained based on the relationship between the selection input data $a_{n+1}$, $b_{n+1}$, and so forth, which are obtained in the operation S2, and the old decision data $d_{n-1}$, $d_{n-2}$, and so forth. For example, the selection input data $a_{n+1}$, $b_{n+1}$, and so forth for the combination of $d_{n-1}$, $d_{n-2}$, and so forth may be obtained for each combination of $a_n$, $b_n$, and so forth, and the combination of $d_{n-1}$, $d_{n-2}$, and so forth may correspond to the outputs $a_{n+1}'$, $b_{n+1}'$, and so forth of the logic circuit. The selection input data $a_{n+1}$, $b_{n+1}$, and so forth corresponding to the outputs $a_{n+1}'$, $b_{n+1}'$, and so forth of the logic circuit are obtained for each combination of $a_n$, $b_n$, and so forth. Therefore, the outputs $a_{n+1}'$, $b_{n+1}'$, and so forth of the logic circuit are obtained based on each combination of the inputs $a_n$, $b_n$, and so forth of the logic circuit.

For example, the old decision data may be $d[-1:-m]=d_{-1}$, $d_{-2}$, $d_{-3}$, ..., $d_{-m}$. In the current sample, for example, in the first row circuits of the decision feedback equalizer, the $2^m$ calculation values which are threshold-value-decided may be $a_{0xxxx...x}$ (x is 0 or 1). The calculation value selected as the decision data d[0] for the current sample may be illustrated as described below for each combination of the old decision data.

$d[-1:-m]=0, 0, 0, 0, \ldots, 0 \rightarrow$ selected calculation value $a_{0000...0}$ $d[-1:-m]=1, 0, 0, 0, \ldots, 0 \rightarrow$ selected calculation value $a_{0100...0}$ $d[-1:-m]=0, 1, 0, 0, \ldots, 0 \rightarrow$ selected calculation value $a_{0010...0}$ $d[-1:-m]=1, 1, 0, 0, \ldots, 0 \rightarrow$ selected calculation value $a_{0110...0}$

...

$d[-1:-m]=1, 1, 1, 1, \ldots, 1 \rightarrow$ selected calculation value $a_{0111...1}$ The first digit of the subscript of "a" indicates the position of the sample. In the next sample, for example, in the second row circuits of the decision feedback equalizer, the $2^m$ calculation values may be $a_{1xxxx...x}$ (x is 1 or 1).

The current sample is selected based on $d[-1:-m]$ and the next sample is selected based on $d[0:-m+1]$. For example, when $d[-1:-m]$ are 0, 0, 0, 0, ..., 0, d[0] may be $a_{0000...0}$. When $a_{0000...0}$ is 0, $a_{1000...0}$ may be selected as d[1], and when $a_{0000...0}$ is 1, $a_{1100...0}$ may be selected as d[1]. When $d[-1:-m]=x1, x2, x3, \ldots, xm$ (each value is 0 or 1), according to the above selected calculation values, d[0] may be $a_{0x1x2x3...xm}$, and $d[0:-m+1]$ may be $a_{0x1x2x3...xm}$, x1, x2, x3, ..., xm-1. When $a_{0x1x2x3...xm}$ is 0, $a_{10x1x2x3...xm-1}$ may be selected as d[1], and when $a_{0x1x2x3...xm}$ is 1, $a_{11x1x2x3...xm-1}$ may be selected. For example, by using the value of $a_{0x1x2x3...xm}$ as a value of selection control, $a_{10x1x2x3...xm-1}$ or $a_{11x1x2x3...xm-1}$ may be selected.

When the control signal of the two-input selection circuit is $a_{0d[-1:m]}$, if $a_{10d[-1:m+1]}$ and $a_{11d[-1:m+1]}$ are input as the input signals to be selected, an m-tap logic circuit may be realized. By providing the combinations of control signal and input signals described below to the $2^m$ two-input selection circuit, an m-tap logic circuit is realized.

Control signal First input signal Second input signal $a_{0000...0}$ $a_{1000...0}$ $a_{1100...0}$ $a_{0100...0}$ $a_{1010...0}$ $a_{1110...0}$ $a_{0010...0}$ $a_{1001...0}$ $a_{1101...0}$ $a_{0110...0}$ $a_{1011...0}$ $a_{1111...0}$

...

$a_{0111...1}$ $a_{1011...1}$ $a_{1111...1}$

Figure 17:
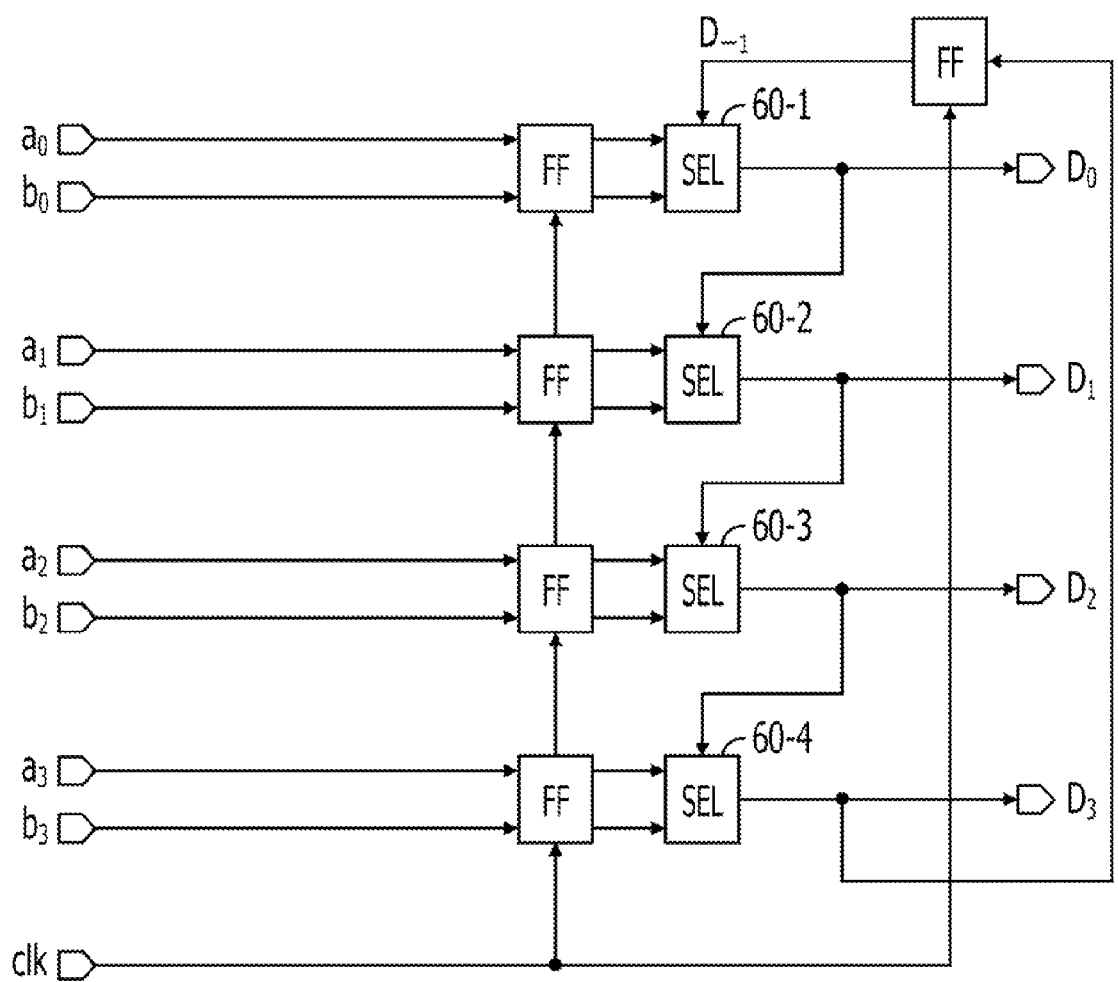
FIG. 17 illustrates an exemplary operation of a logic circuit.

FIG. 17 illustrates an exemplary decision feedback equalizer. The circuit illustrated in FIG. 17 may be a one-tap parallel decision feedback equalizer. For example, the circuit illustrated in FIG. 17 may be a four-parallel circuit. In FIG. 17, the two calculation values, which are threshold-value-decided for each of the four samples, may be $a_0$ and $b_0$, $a_1$ and $b_1$, $a_2$ and $b_2$, and $a_3$ and $b_3$. The data decision values for each of the four samples may be $D_0$ to $D_3$. The data decision value transferred from the previous cycle to the current cycle may be $D_{-1}$. The selection circuits 60-1 to 60-4 may be cascade-coupled and four-stage selection may be sequentially performed.

Figure 18:
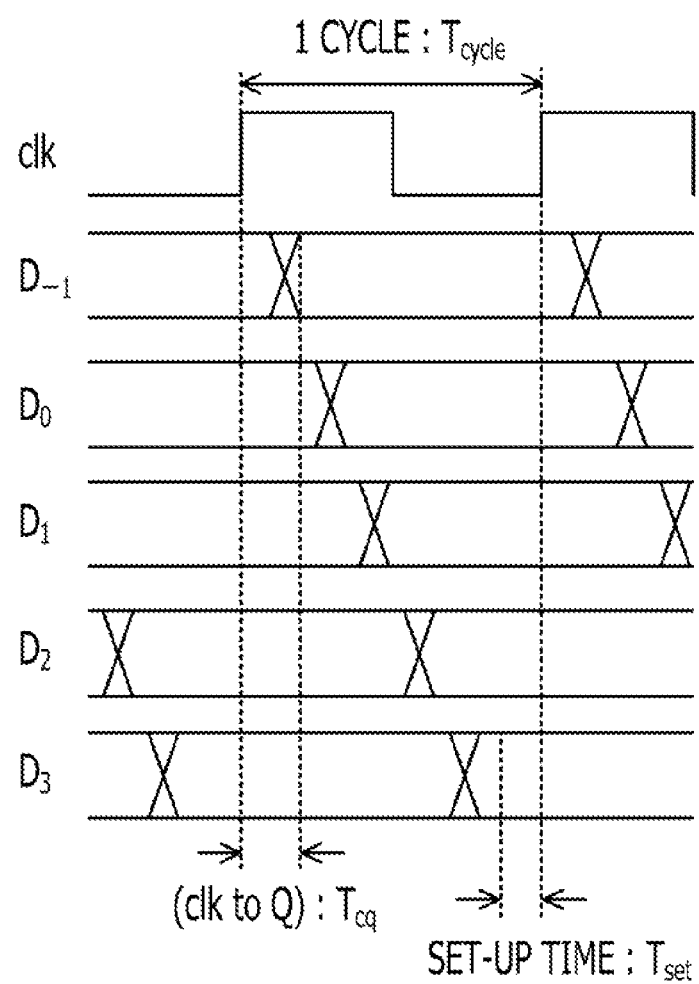
FIG. 18 illustrates an exemplary operation.

FIG. 18 illustrates an exemplary selection. The decision feedback equalizer illustrated in FIG. 17 may perform the selection illustrated in FIG. 18. As illustrated in FIG. 18, after the data decision value $D_{-1}$ is set, $D_0$ to $D_3$ may be sequentially ser one by one. When the clock cycle is $T_{cycle}$, a period of time from when the clock rises to when the output Q of flip-flop is set is $T_{cq}$, and the set-up time is $T_{set}$, a time period of selection of one selection circuit SEL may be $(T_{cycle}-T_{set}-T_c)/4$.

Figure 19:
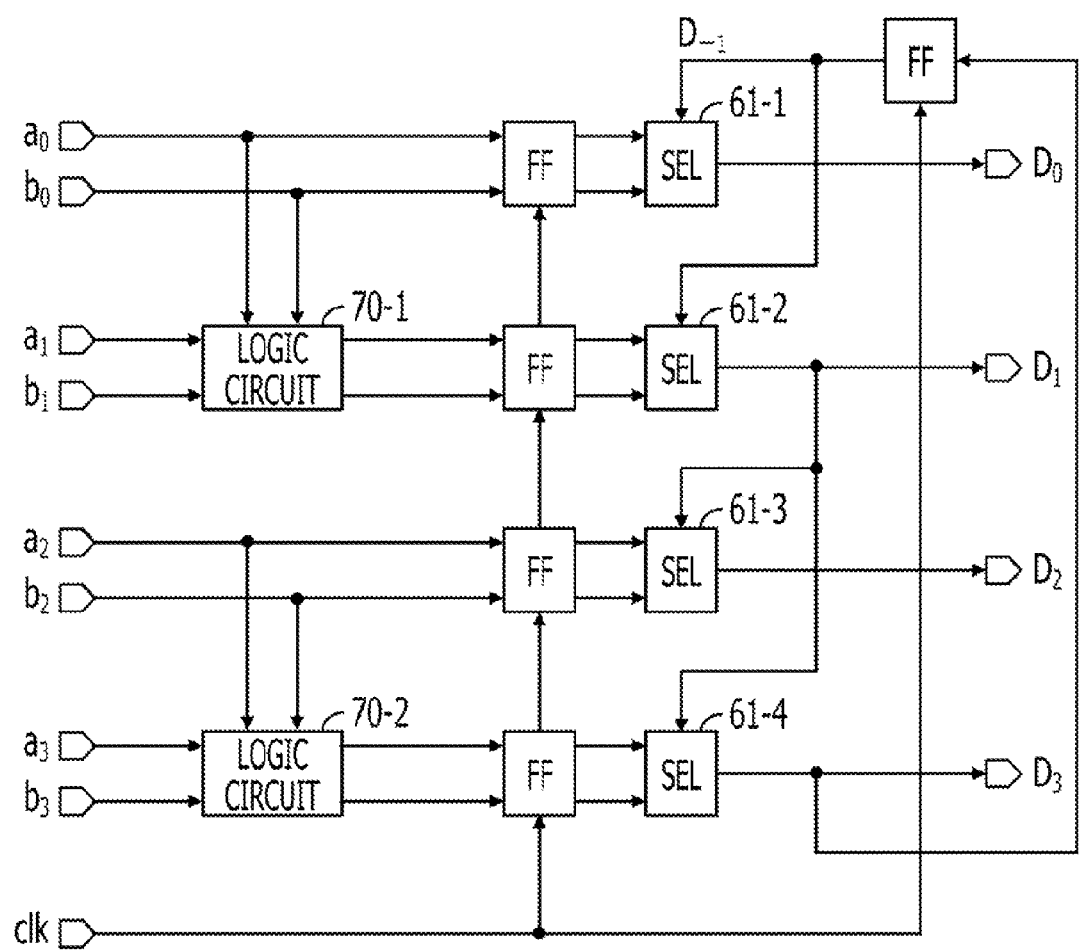
FIG. 19 illustrates an exemplary decision feedback equalizer.

FIG. 19 illustrates an exemplary decision feedback equalizer. The decision feedback equalizer illustrated in FIG. 19 may be a circuit when the parallel decision feedback equalizer illustrated in FIG. 1 is a one-tap circuit. For example, the circuit illustrated in FIG. 19 may be a four-parallel circuit. The calculation values $a_0$ and $b_0$, $a_1$ and $b_1$, $a_2$ and $b_2$, and $a_3$ and $b_3$, which are threshold-value-decided, and the data decision values $D_{-1}$ to $D_3$ in FIG. 19 may be substantially the same as the values illustrated in FIG. 17. In FIG. 19, the logic circuits 70-1 and 70-2 corresponding to the logic circuits 12-2 to 12-L illustrated in FIG. 1 are provided every other row, and for example, the selection circuit 61-3 in the third row is cascade-coupled to the selection circuit 61-2 in the second row. As illustrated in FIG. 1, the output of the data holding circuit 15 may be used as the selection control signal of all the selection circuits 14-1 to 14-L, and the data decision value of the previous sample may be input into some of the selection circuits 61-1 to 61-4. Since, in FIG. 19, the selection circuits are cascade-coupled in two stages, two-stage selection may be sequentially performed.

Figure 20:
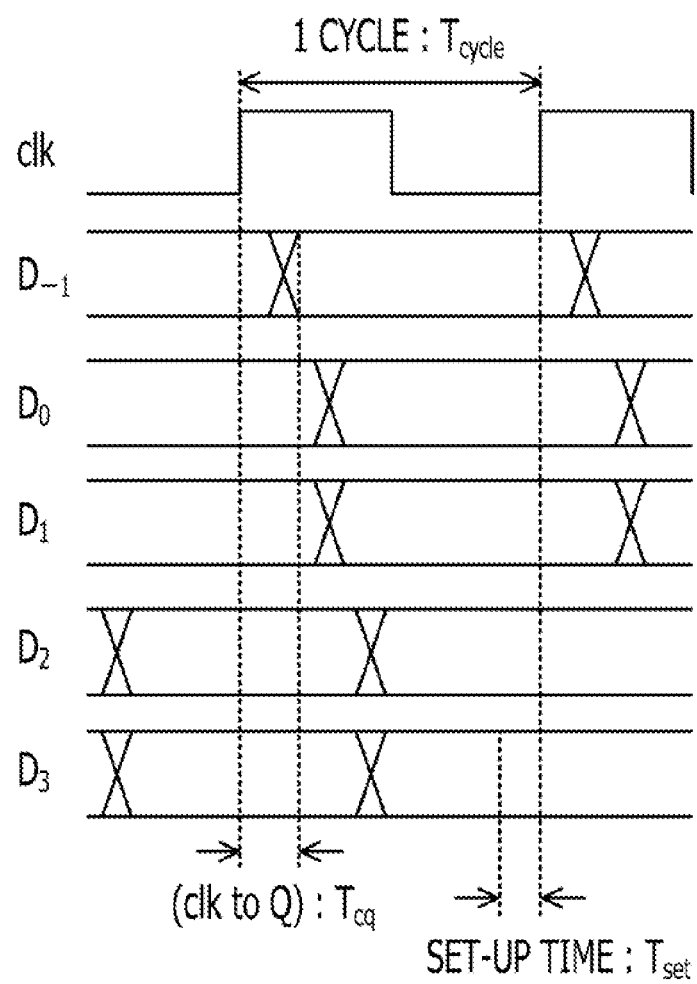
FIG. 20 illustrates an exemplary selection.

FIG. 20 illustrates an exemplary selection. The decision feedback equalizer illustrated in FIG. 19 may perform the selection illustrated in FIG. 20. When the data decision value $D_{-1}$ is ser, $D_0$ and $D_1$ are set, and after a certain time has elapsed, $D_2$ and $D_3$ are set. $D_0$ and $D_1$ as well as $D_2$ and $D_3$ may be set contemporaneously. When the clock cycle is set to $T_{cycle}$, a period of time from when the clock rises to when the output Q of flip-flop is set is set to $T_{cq}$, and the set-up time is set to $T_{set}$, a time period of selection of one selection circuit SEL may be $(T_{cycle}-T_{set}-T_{cq})/2$.

Figure 21:
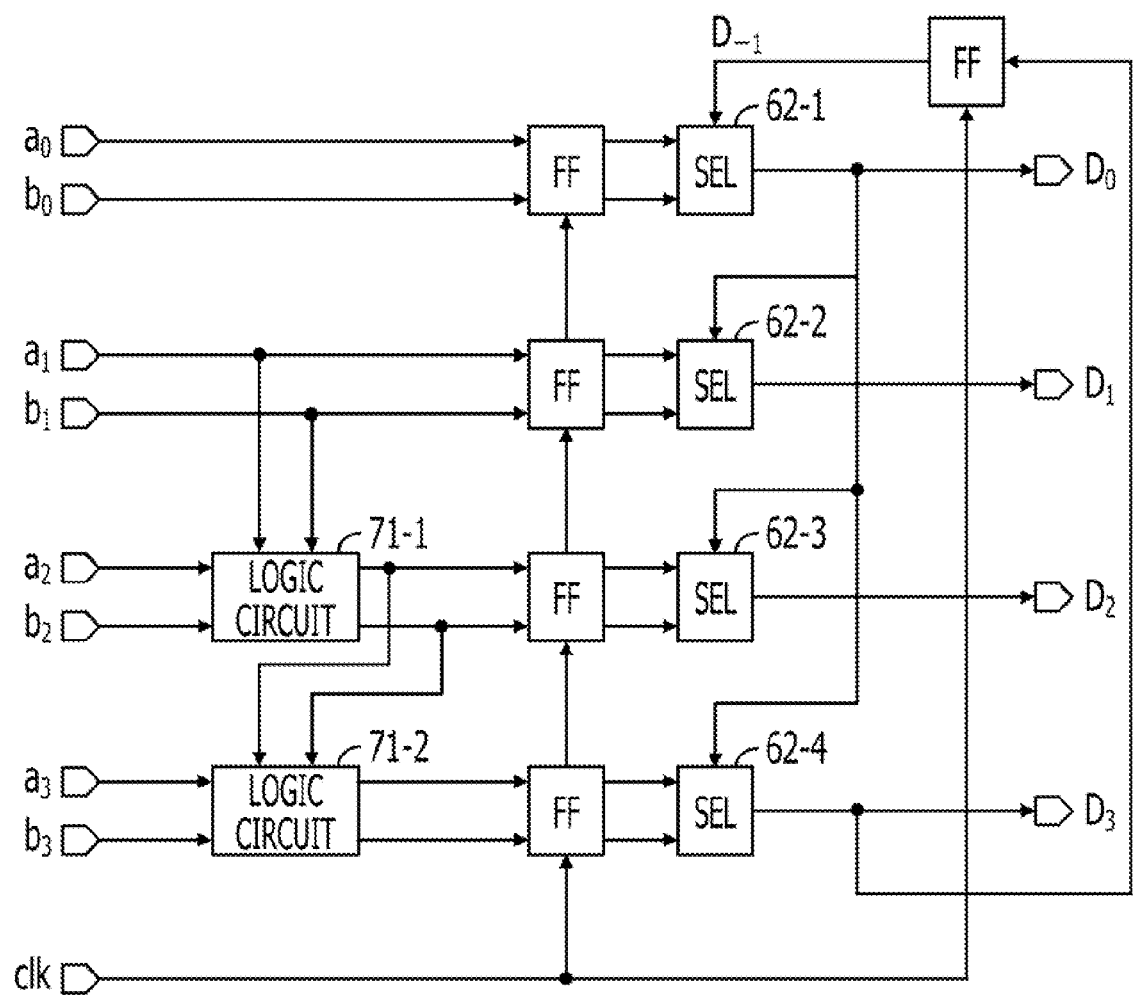
FIG. 21 illustrates an exemplary decision feedback equalizer.

FIG. 21 illustrates an exemplary decision feedback equalizer. The decision feedback equalizer illustrated in FIG. 21 may correspond to the parallel decision feedback equalizer of one-tap configuration illustrated in FIG. 1. The circuit illustrates in FIG. 21 may be a four-parallel type decision feedback equalizer, and the calculation values $a_0$ and $b_0$, $a_1$ and $b_1$, $a_2$ and $b_2$, and $a_3$ and $b_3$, which are threshold-value-decided, and the data decision values $D_{-1}$ to $D_3$ may correspond to the values illustrated in FIG. 17. In FIG. 21, the logic circuits 71-1 and 71-2 corresponding to the logic circuits 12-2 to 12-L illustrated in FIG. 1 are provided in the third and the fourth rows, and the selection circuit 62-2 in the second row is cascade-coupled to the selection circuit 62-1 in the first row. The output of the data holding circuit 15 may be provided as the selection control signal of all the selection circuits 14-1 to 14-L, and the data decision value of the previous sample may be provided to some of the selection circuits 62-1 to 62-4.

Since, in FIG. 21, the selection circuits are cascade-coupled in two stages, two-stage selection may be sequentially performed.

Figure 22:
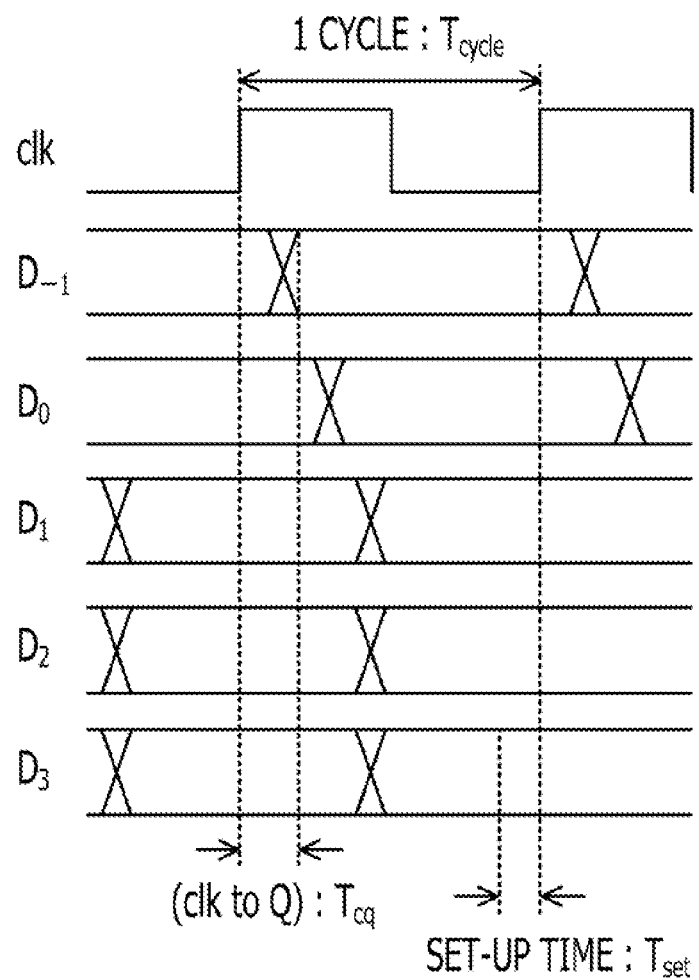
FIG. 22 illustrates an exemplary selection.

FIG. 22 illustrates an exemplary selection. The decision feedback equalizer illustrated in FIG. 21 may perform the selection illustrated in FIG. 22. When the data decision value $D_{-1}$ is fixed, $D_0$ is set, and after a certain time has elapsed, $D_1$ to $D_3$ are set. $D_1$ to $D_3$ may be set contemporaneously. When the clock cycle is set to $T_{cycle}$, a period of time from when the clock rises to when the output Q of flip-flop is set is set to $T_{cq}$, and the set-up time is set to $T_{set}$, a time period of selection of one selection circuit SEL may be $(T_{cycle}-T_{set}-T_{cq})/2$.

Figure 23:
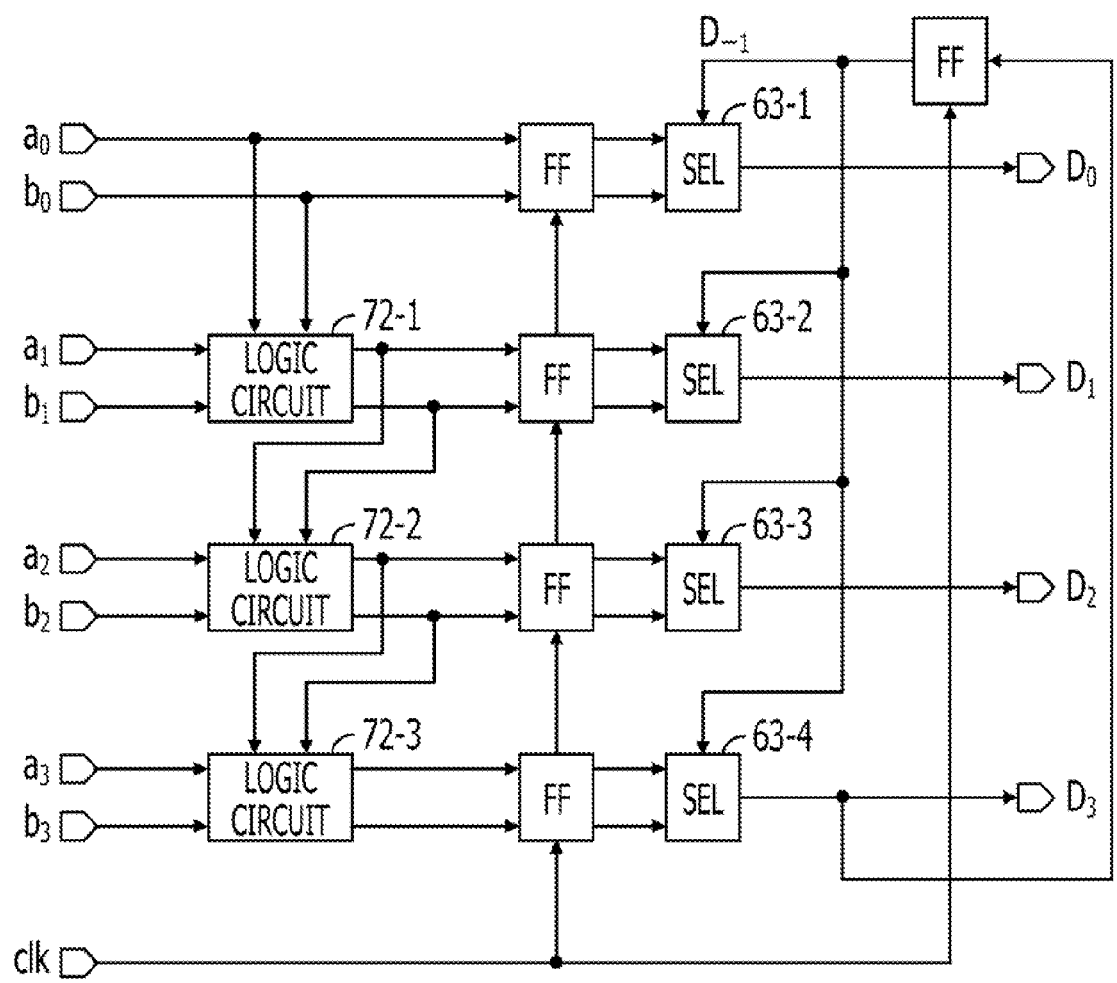
FIG. 23 illustrates an exemplary decision feedback equalizer.

FIG. 23 illustrates an exemplary decision feedback equalizer. The decision feedback equalizer illustrated in FIG. 23 may correspond to the parallel decision feedback equalizer of one-tap configuration illustrated in FIG. 1. The circuit illustrated in FIG. 23 may be a four-parallel type decision feedback equalizer, and the calculation values $a_0$ and $b_0$, $a_1$ and $b_1$, $a_2$ and $b_2$, and $a_3$ and $b_3$, which are threshold-value-decided, and the data decision values $D_{-1}$ to $D_3$ may correspond to the values illustrated in FIG. 17. In FIG. 23, the logic circuits 72-1 to 72-3 corresponding to the logic circuits 12-2 to 12-L illustrated in FIG. 1 are provided in the second to the fourth rows, and the selection circuits may not be cascade-coupled. In FIG. 23, the selection circuits 63-1 to 63-4 use the data decision signal $D_{-1}$ as a common selection control signal. Since the logic circuit illustrated in FIG. 23 does not include cascade-connected selection circuits, the selection may be performed once contemporaneously.

Figure 24:
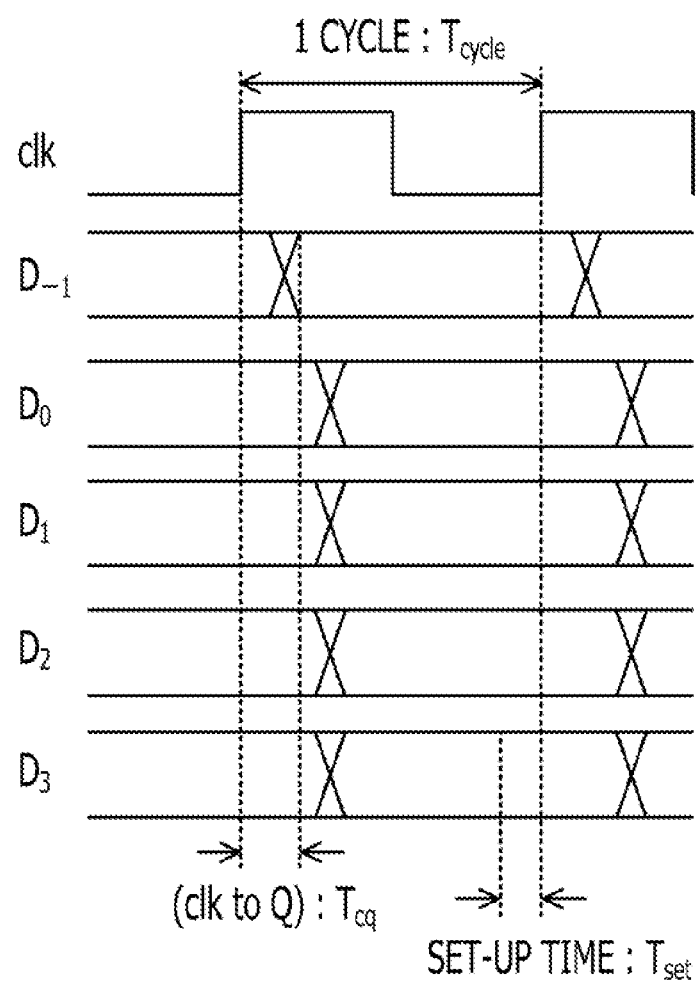
FIG. 24 illustrates an exemplary selection.

FIG. 24 illustrates an exemplary selection. The decision feedback equalizer illustrated in FIG. 23 may perform the selection illustrated in FIG. 24. When the data decision value $D_{-1}$ is set, $D_0$ to $D_3$ are set. $D_0$ to $D_3$ may be set contemporaneously. When the clock cycle is set to $T_{cycle}$, a period of time from when the clock rises to when the output Q of flip-flop is set is set to $T_{cq}$, and the set-up time is set to $T_{set}$, a time period of selection of one selection circuit SEL may be $(T_{cycle}-T_{set}-T_{cq})$.

Figure 25:
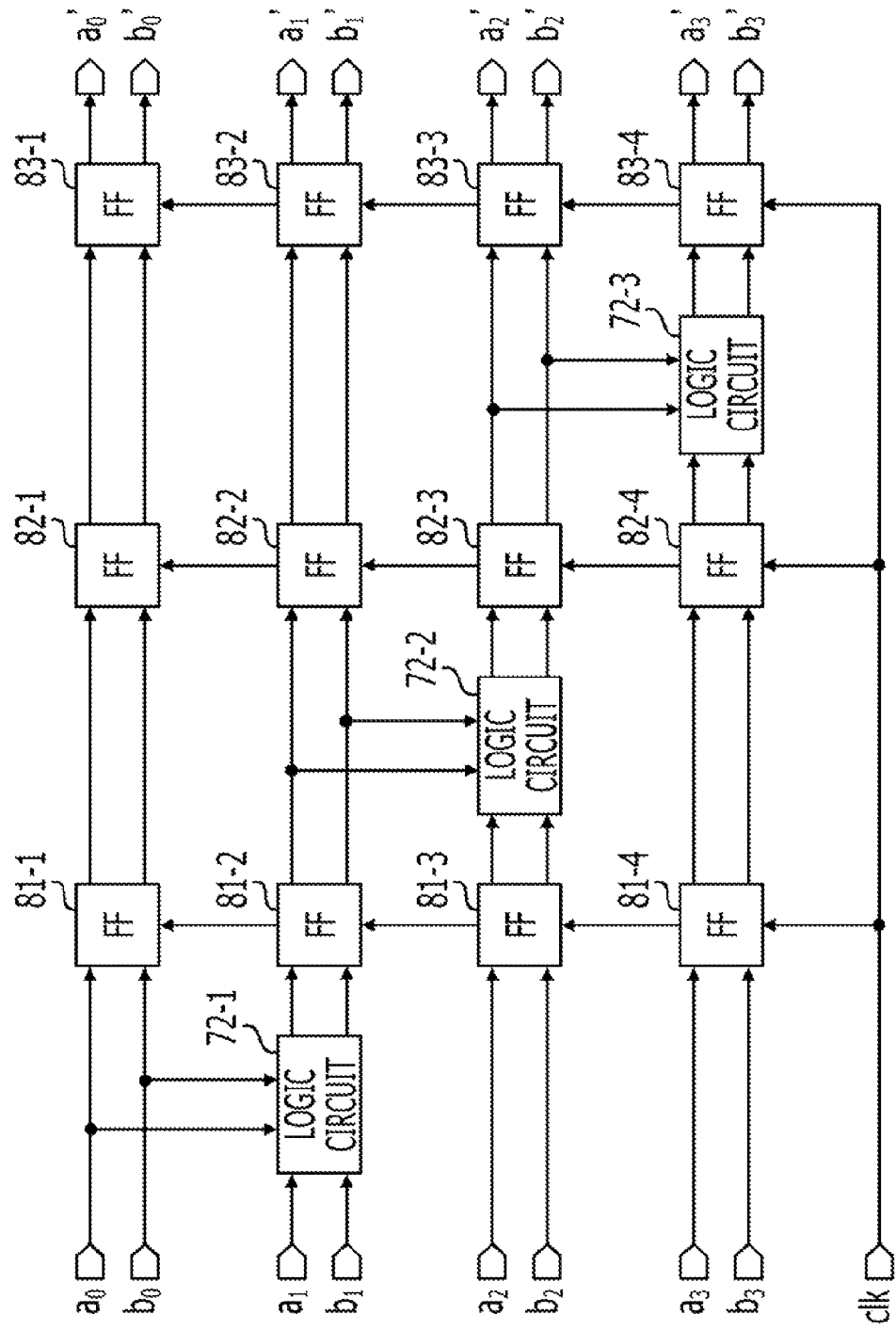
FIG. 25 illustrates an exemplary decision feedback equalizer.

FIG. 25 illustrates an exemplary decision feedback equalizer. In FIG. 25, a flip-flop is inserted between a plurality of cascade-coupled logic circuits, and a process is divided into a plurality of cycles. In FIG. 25, elements that are substantially the same as or similar to those illustrated in FIG. 23 are given the same reference numerals and the description may be omitted or reduced.

In the decision feedback equalizers illustrated in FIGS. 1 and 23, the logic circuits 12-2 to 12-L and the logic circuits 72-1 to 72-3 are cascade-coupled, and unless the previous stage of logic circuit operation is completed, the next stage of logic circuit operation may not be started. As illustrated in FIGS. 7 and 11, the logic circuit includes selection circuits. For example, since the logic circuits cascade-coupled in three stages illustrated in FIG. 23 perform calculations for three stages of gates, the calculation time may set the speed of the decision feedback equalization process. Since the logic circuits are not provided in the feedback path, the process may be divided into a plurality of cycles by inserting the flip-flops 81-2 and 82-3 between the logic circuits 72-1 and 72-3 as illustrated in FIG. 25. As the flip-flop 81-2 is inserted, the flip-flops 81-1, 81-3, and 81-4 may be inserted in order to synchronize the process cycles of all the rows. As the flip-flop 82-3 is inserted, the flip-flops 82-1, 82-2, and 82-4 may be inserted in order to synchronize the process cycles of all the rows. The flip-flops 83-1 to 83-4 illustrated in FIG. 25 may correspond to the flip-flops provided in the previous stage of the selection circuits 63-1 to 63-4 illustrated in FIG. 23. The flip-flops illustrated in FIG. 25 may operate in synchronization with the clock signal clk.

Since the logic circuits illustrated in FIG. 25 perform process of three stages in three cycles, each logic circuit may perform processing of one stage in one cycle. As the size of the circuits increases, the hardware cost increases, and the latency from when data is input to when the data is output may increase. As illustrated in FIGS. 19 and 21, the circuits whose size is reduced may operate at a desired operation speed by reducing the number of cascade-coupled logic circuits.

For example, the circuit illustrated in FIG. 19 selects the data decision value $D_3$ of the target sample based on the data decision value $D_1$ of the sample previous to the previous sample. The circuit illustrated in FIG. 21 selects the data decision value $D_3$ of the target sample based on the data decision value $D_0$ of the sample which is taken three samples before. When the data decision value of the target sample is selected based on the sample which is taken N samples before, the number N may be used as an index indicating the number of logic circuits used for the data selection.

When N increases, the speed of the critical path of the decision feedback equalization process increases. The number of the logic circuits may increase. The process time of the logic circuits may be reduced by inserting the flip-flop circuits as illustrated in FIG. 25. The latency may increase. The minimum N is set so that the process of the feedback path of the decision feedback equalizer process is performed within one cycle, and the process time of the previous stage, for example, the time period from when the equalization calculation is started to when the process of the logic circuits is completed may be set to one cycle or less. The circuit illustrated in FIG. 1 may not include the data holding circuits 13-1 to 13-L, and the processes of the previous stage and the process of the feedback path may be performed in one cycle.

Figure 26:
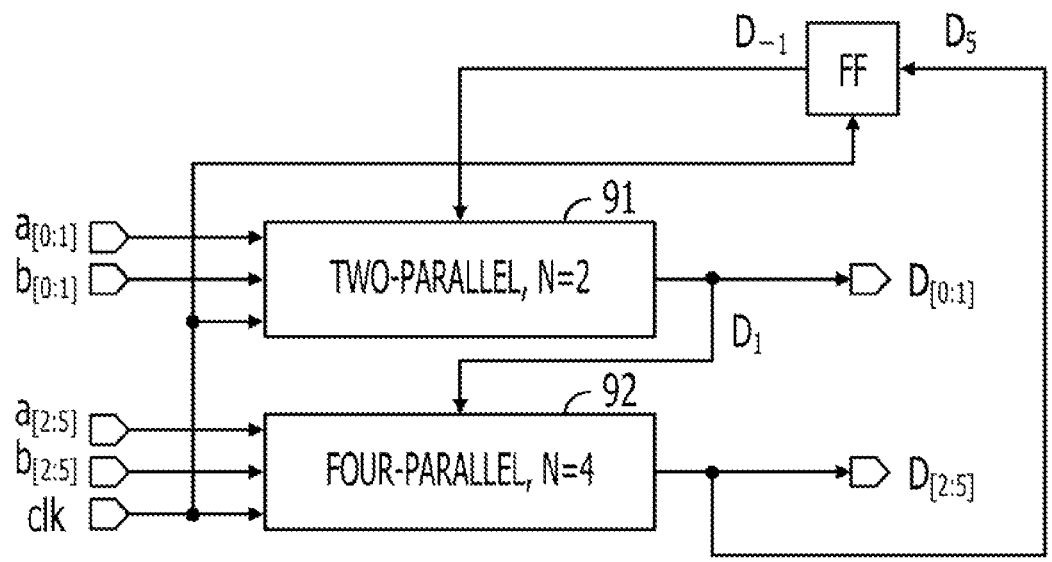
FIG. 26 illustrates an exemplary decision feedback equalizer.
Figure 27:
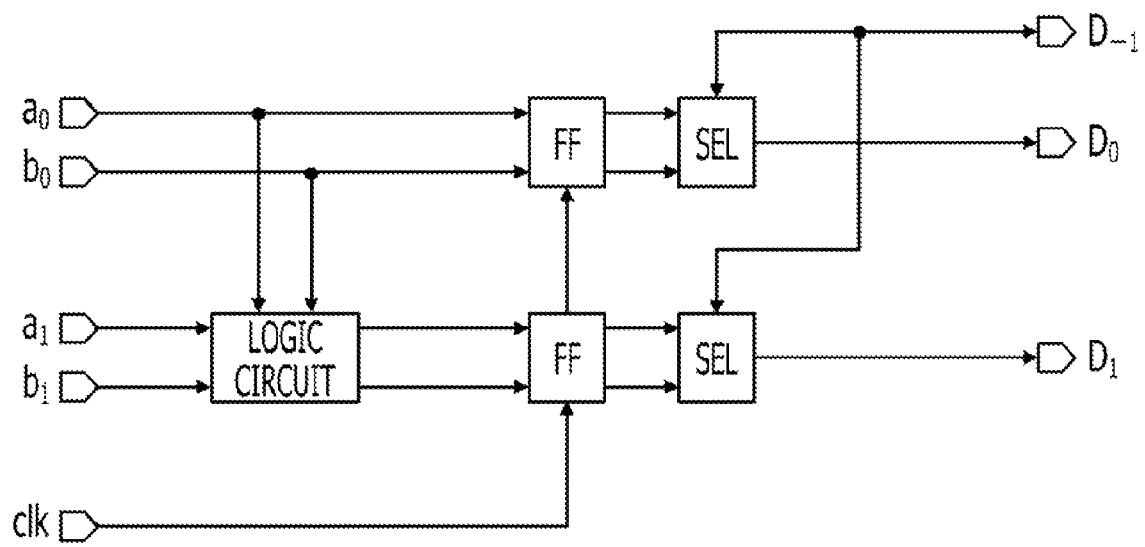
FIG. 27 illustrates an exemplary decision feedback equalizer.

FIGS. 26 and 27 illustrate an exemplary decision feedback equalizer. In FIG. 26, a two-parallel type decision feedback equalizer 91 in which N is 2 and a four-parallel type decision feedback equalizer 92 in which N is 4 are coupled in parallel. The four-parallel type decision feedback equalizer 92 may correspond to the circuit illustrated in FIG. 23. The two-parallel type decision feedback equalizer 91 may correspond to the circuit illustrated in FIG. 27. In FIG. 26, after $D_0$ and $D_1$ are decided, $D_2$, $D_3$, $D_4$, and $D_5$ are decided. $D_0$ and $D_1$ may be decided contemporaneously, and $D_2$, $D_3$, $D_4$, and $D_5$ may be decided contemporaneously. The selection circuits may operate in two stages within one cycle. N may be arbitrarily applied to the number of parallel circuits, and optimal N may be set based on the previous stage process and the next stage process.

Figure 28:
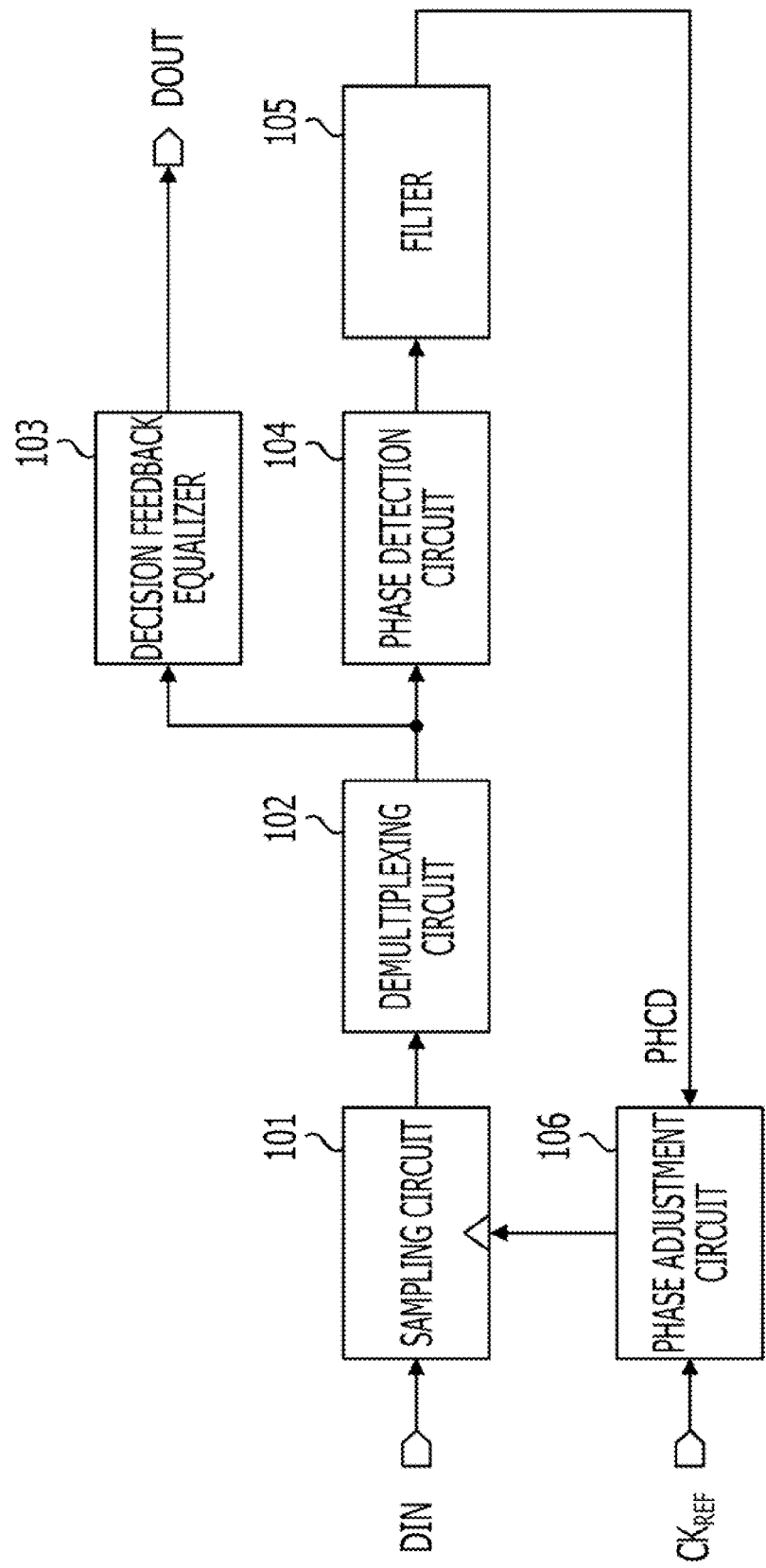
FIG. 28 illustrates an exemplary receiving circuit.

FIG. 28 illustrates an exemplary receiving circuit. The receiving circuit illustrated in FIG. 28 includes a sampling circuit 101, a demultiplexing circuit 102, a decision feedback equalizer 103, a phase detection circuit 104, a filter 105, and a phase adjustment circuit 106. The sampling circuit 101 two-time-oversamples receiving data DIN based on a sampling clock and outputs multi-bit data per sample. The data includes a target data to be detected, for example, a value of the center of data eye, and boundary data, for example, a value of a boundary between target data sets to be detected. The demultiplexing circuit 102 demultiplexes the target data and the boundary data to a data rate at which a digital circuit performs parallel process. The decision feedback equalizer 103 receives the target data as input data, and outputs a data decision value DOUT. The decision feedback equalizer 103 may be any one of the decision feedback equalizers described above. The phase detection circuit 104 detects a phase of data boundary with respect to the sampling clock based on the target data and the boundary data from the demultiplexing circuit 102. The filter 105 generates a phase adjustment code PHCD based on the detected phase. The phase adjustment circuit 106 adjusts timing of the sampling clock to be supplied to the sampling circuit 101 so that the center of the data eye and the boundary between the data sets is sampled according to the phase adjustment code PHCD.

Figure 29:
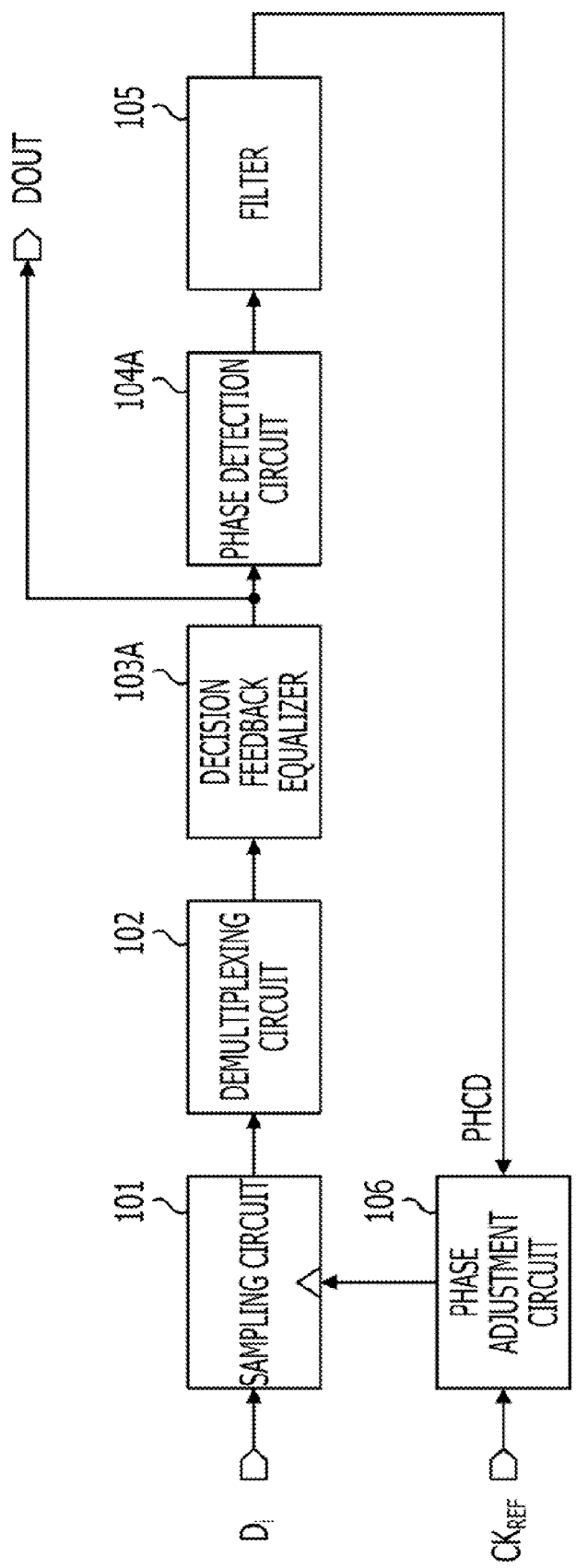
FIG. 29 illustrates an exemplary receiving circuit.

FIG. 29 illustrates an exemplary receiving circuit. In FIG. 29, elements that are substantially the same as or similar to those illustrated in FIG. 28 are given the same reference numerals and the description may be omitted or reduced. The receiving circuit illustrated in FIG. 29 includes a sampling circuit 101, a demultiplexing circuit 102, a decision feedback equalizer 103A, a phase detection circuit 104A, a filter 105, and a phase adjustment circuit 106. The decision feedback equalizer 103A receives the detection target data and the boundary value as input data, and outputs a data decision value DOUT. The decision feedback equalizer 103A may be any one of the decision feedback equalizers described above. The phase detection circuit 104A detects a phase of data boundary with respect to the sampling clock based on the equalized data and the boundary value output from the decision feedback equalizer 103A. The filter 105 generates a phase adjustment code PHCD based on the detected phase.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:
1. A decision feedback equalizer comprising:
   L equalization calculation circuits, L being a positive integer, to perform an equalization calculation of a first sample of input data for each of M combinations of data decision values of a second sample sampled from the input data before sampling the first sample;
   a first logic circuit to generate first M logical values, M being an integer greater than 2, by selecting and arranging calculation values of M calculation values calculated by at least one equalization calculation circuit among the L equalization calculation circuits based on a data decision value for a third sample sampled before sampling the first sample; and
   a selection circuit to select one of the first M logical values based on a data decision value for a fourth sample sampled before sampling the third sample, and to output the selected logical value as a data decision value of the first sample.

2. The decision feedback equalizer according to claim 1, further comprising:
   a second logic circuit having substantially the same logic as logic of the first logic circuit; and
   a second selection circuit to generate second M logical values by selecting and arranging calculation values of the M calculation values based on the first M logical values, to select one of the second M logical values based on the data decision value for the fourth sample, and to output the selected logical value as a data decision value of the second sample.

3. The decision feedback equalizer according to claim 2, further comprising:
   a third logic circuit having substantially the same logic as logic of the first logic circuit: and
   a third selection circuit to generate third M logical values by selecting and arranging calculation values of M calculation values for a fifth sample sampled before sampling the second sample based on the second M logical values, select one of the third M logical values based on the data decision value for the fourth sample, and to output the selected logical value as a data decision value of the fifth sample.

4. The decision feedback equalizer according to claim 1, further comprising,
   a data holding circuit to store at least one of the data decision values.

5. The decision feedback equalizer according to claim 1, further comprising,
   a fourth selection circuit to select one of the first M calculation values based on the data decision value of the fourth sample and to output the selected calculation value as a data decision value of the third sample.

6. The decision feedback equalizer according to claim 1, further comprising,
   a fifth selection circuit to select one of M calculation values of a sixth sample, which is sampled before sampling the first sample and is different from the third sample, based on the data decision value of the third sample and to output the selected calculation value as a data decision value of the sixth sample.

7. The decision feedback equalizer according to claim 1, further comprising,
   a data holding circuit, provided between the logic circuit and the selection circuit, to hold the M logical values in synchronization with a clock.

8. A receiving circuit comprising:
   a sampling circuit to sample receiving data in synchronization with a sampling clock;
   a demultiplexing circuit to demultiplex the receiving data sampled by the sampling circuit;
   a decision feedback equalizer to decide L samples of input data from the demultiplexing circuit, L being a positive integer; and
   a phase adjustment circuit to adjust phase of the sampling clock based on the sampled receiving data,
   wherein the decision feedback equalizer includes,
   L equalization calculation circuits to perform an equalization calculation of a first sample of input data for each of M combinations of data decision values of a second sample sampled from the input data before sampling the first sample, M being an integer greater than 2;
   a first logic circuit to generate first M logical values by selecting and arranging calculation values of M calculation values calculated by at least one equalization calculation circuit among the L equalization calculation circuits based on data decision value for a third sample sampled before sampling the first data; and
   a selection circuit to select one of the first M logical values based on a data decision value for a fourth sample sampled before sampling the third sample, and to output the selected logical value as a data decision value of the first sample.

9. The receiving circuit according to claim 8, further comprising:
   a second logic circuit having substantially the same logic as logic of the first logic circuit; and
   a second selection circuit to generate second M logical values by selecting and arranging calculation values of the M calculation values based on the first M logical values, to select one of the second M logical values based on the data decision value for the fourth sample, and to output the selected logical value as a data decision value of the second sample.

10. The receiving circuit according to claim 9, further comprising:
    a third logic circuit having substantially the same logic as logic of the first logic circuit; and
    a third selection circuit to generate third M logical values by selecting and arranging calculation values of M calculation values for a fifth sample sampled before sampling the second sample based on the second M logical values, select one of the third M logical values based on the data decision value for the fourth sample, and to output the selected logical value as a data decision value of the fifth sample.

11. The receiving circuit according to claim 8, further comprising,
    a data holding circuit to store at least one of the data decision values.

12. The receiving circuit according to claim 8, further comprising,
    a fourth selection circuit to select one of the first M calculation values based on the data decision value of the fourth sample and to output the selected calculation value as a data decision value of the third sample.

13. The receiving circuit according to claim 8, further comprising,
    a fifth selection circuit to select one of M calculation values of a sixth sample, which is sampled before sampling the first sample and is different from the third sample, based on the data decision value of the third sample and to output the selected calculation value as a data decision value of the sixth sample.

14. The receiving circuit according to claim 8, further comprising,
    a data holding circuit, provided between the logic circuit and the selection circuit, to hold the M logical values in synchronization with a clock.

15. A decision feedback equalization process method comprising:
    performing an equalization calculation of a first sample of input data for each of M combinations of data decision values of a second sample sampled from the input data before sampling the first sample by using L equalization calculation circuits, M being an integer greater than 2 and L being a positive integer;
    generating first M logical values by selecting and arranging calculation values of M calculation values calculated by at least one equalization calculation circuit among the L equalization calculation circuits based on a data decision value for a third sample sampled before sampling the first sample by a first logic circuit;
    selecting one of the M logical values based on a data decision value for a fourth sample sampled before sampling the third sample; and
    outputting the selected logical value as a data decision value of the first sample.

16. The decision feedback equalization process method according to claim 15, further comprising:
    generating second M logical values by selecting and arranging calculation values of the M calculation values based on the first M logical values by a second logic circuit having substantially the same logic as logic of the first logic circuit; and selecting one of the second M logical values based on the data decision value for the fourth sample; and outputting the selected logical value as a data decision value of the second sample.

17. The decision feedback equalization process method according to claim 16, further comprising:

generating third M logical values by selecting and arranging calculation values of M calculation values for a fifth sample sampled before the second sample based on the second M logical values by a third logic circuit having substantially the same logic as logic of the first logic circuit; and selecting one of the third M logical values based on the data decision value for the fourth sample; and outputting the selected logical value as a data decision value of the fifth sample.

* * * * *